(12) United States Patent
Hashizume

(10) Patent No.: US 12,486,886 B2
(45) Date of Patent: Dec. 2, 2025

(54) TORQUE TRANSMISSION MECHANISM

(71) Applicant: SEIKO EPSON CORPORATION, Tokyo (JP)

(72) Inventor: Keitaro Hashizume, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/185,256

(22) Filed: Apr. 22, 2025

(65) Prior Publication Data

US 2025/0334170 A1    Oct. 30, 2025

(30) Foreign Application Priority Data

Apr. 25, 2024 (JP) ................ 2024-071258

(51) Int. Cl.
*F16H 13/08* (2006.01)

(52) U.S. Cl.
CPC .................... *F16H 13/08* (2013.01)

(58) Field of Classification Search
CPC ................ F16H 13/04; F16H 13/08
See application file for complete search history.

(56) References Cited

U.S. PATENT DOCUMENTS

| 4,617,838 | A * | 10/1986 | Anderson | ............ F16H 13/08 475/195 |
| 2018/0306296 | A1* | 10/2018 | Sakata | .............. F16H 48/147 |
| 2024/0026957 | A1* | 1/2024 | Tsay | .................. F16H 13/08 |

FOREIGN PATENT DOCUMENTS

JP    2019132364    8/2019

* cited by examiner

*Primary Examiner* — Huan Le
(74) *Attorney, Agent, or Firm* — JCIPRNET

(57) ABSTRACT

A torque transmission mechanism includes a first member having a cylindrical shape and configured to be rotatable around a rotation axis, the first member including an outer peripheral surface provided with a first groove having a zigzag shape extending around the rotation axis, a second member having an annular shape surrounding the first member and configured to be rotatable around the rotation axis, the second member including an inner peripheral surface provided with a second groove having a zigzag shape extending around the rotation axis, one or more first rolling members disposed in and configured to be rollable in the first groove and in the second groove, and a first regulating member disposed between the first member and the second member and configured to allow movement of the first rolling members along the rotation axis and regulate movement of the first rolling members around the rotation axis.

13 Claims, 15 Drawing Sheets

TORQUE TRANSMISSION MECHANISM

The present application is based on, and claims priority from JP Application Serial Number 2024-071258, filed Apr. 25, 2024, the disclosure of which is hereby incorporated by reference herein in its entirety.

BACKGROUND

1. Technical Field

The present disclosure relates to a torque transmission mechanism.

2. Related Art

With respect to the torque transmission mechanism, JP 2019-132364 A discloses an eccentric oscillation type deceleration mechanism. In the deceleration mechanism disclosed in JP 2019-132364 A, torque transmission is achieved by transmitting a rotation component of an external gear to a carrier body via an inner pin.

With the technique disclosed in JP 2019-132364 A, when the mechanism operates, a load in a shearing direction is applied to the inner pin in charge of the torque transmission, and thus there was a risk that the inner pin was broken.

SUMMARY

According to an embodiment of the present disclosure, a torque transmission mechanism is provided. The torque transmission mechanism includes a first member having a cylindrical shape and configured to be rotatable around a rotation axis, the first member including an outer peripheral surface provided with a first groove having a zigzag shape extending around the rotation axis, a second member having an annular shape surrounding the first member and configured to be rotatable around the rotation axis, the second member including an inner peripheral surface provided with a second groove having a zigzag shape extending around the rotation axis, one or more first rolling members disposed in the first groove and in the second groove and configured to be rollable in the first groove and in the second groove, and a first regulating member disposed between the first member and the second member and configured to allow movement of the first rolling members along the rotation axis and regulate movement of the first rolling members around the rotation axis.

DESCRIPTION OF EMBODIMENTS

A. First Embodiment

Figure 1:
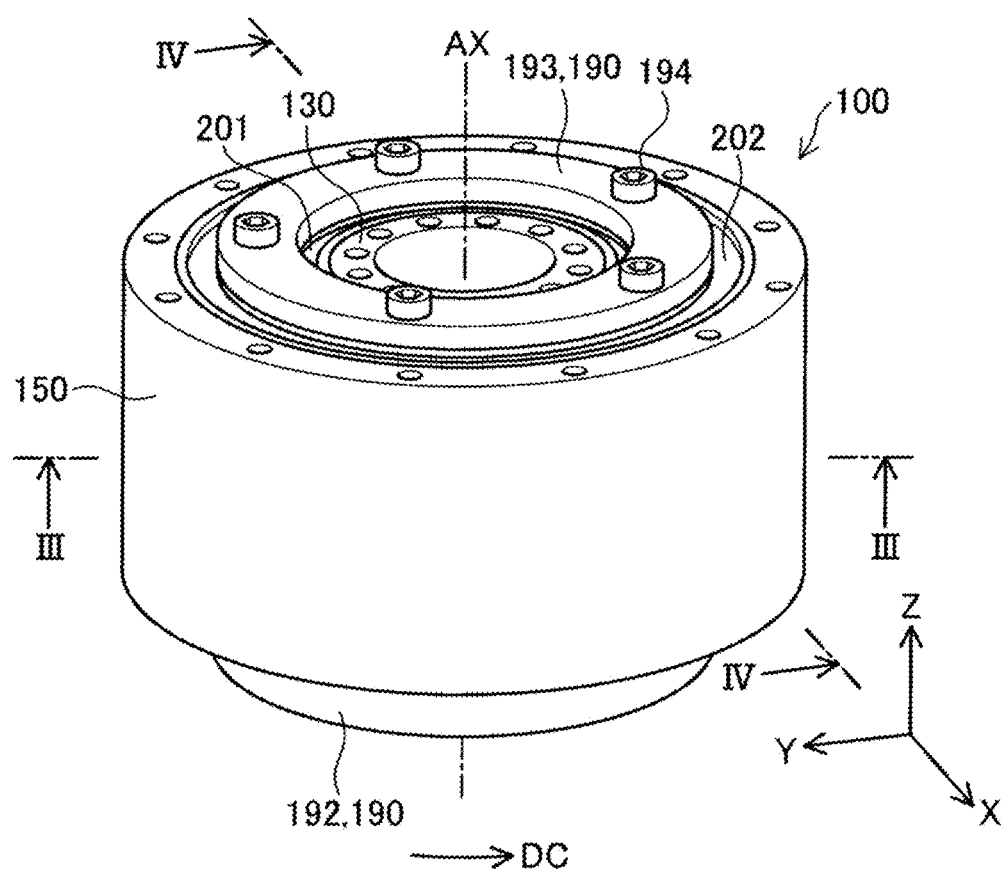
FIG. 1 is a perspective view illustrating a schematic configuration of a torque transmission mechanism in a first embodiment.
Figure 2:
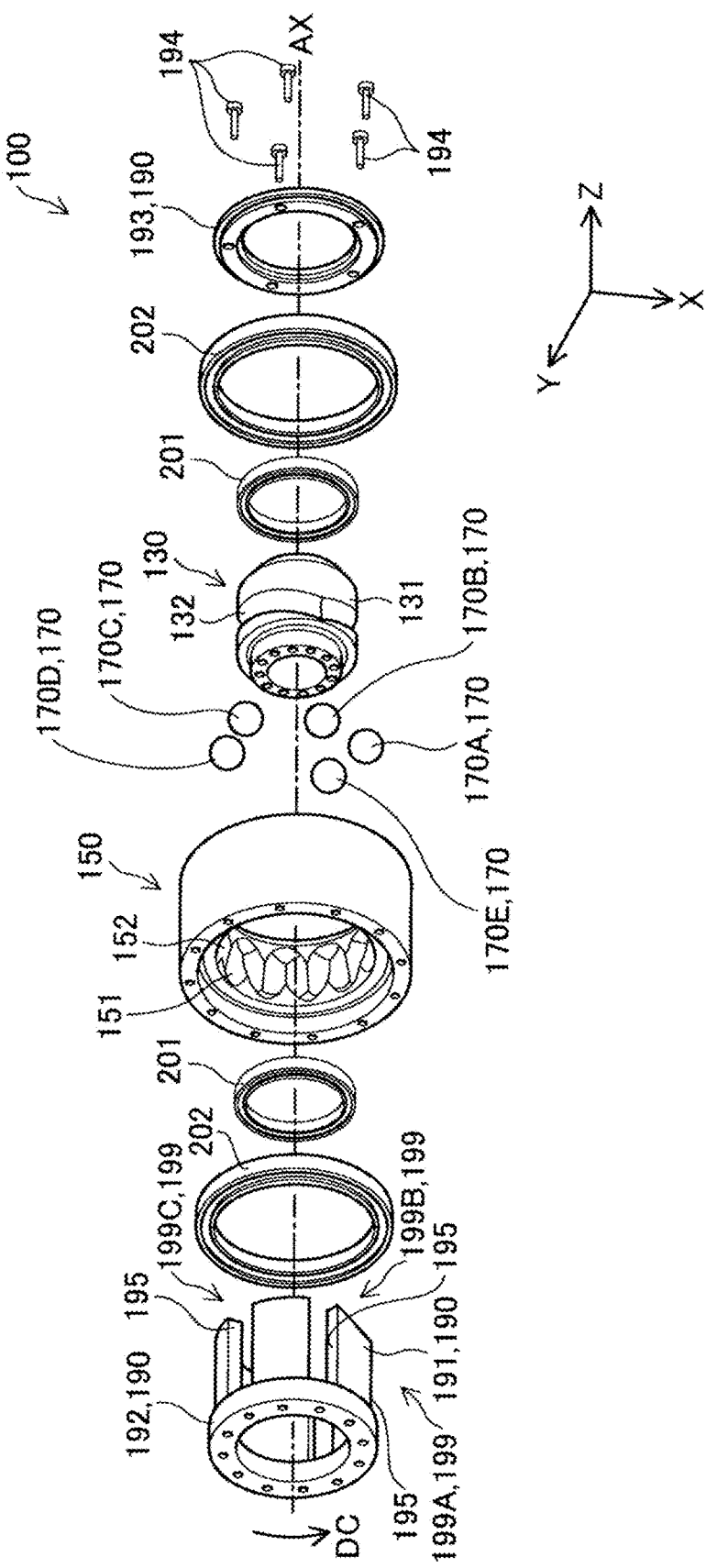
FIG. 2 is an exploded perspective view illustrating a schematic configuration of the torque transmission mechanism in the first embodiment.

FIG. 1 is a perspective view illustrating a schematic configuration of a torque transmission mechanism 100 in a first embodiment. FIG. 2 is an exploded perspective view illustrating a schematic configuration of the torque transmission mechanism 100. FIG. 1 illustrates arrows representing X, Y, and Z directions orthogonal to each other. The X direction and the Y direction are directions parallel to a horizontal surface, whereas the Z direction is a direction along a vertically upward direction. The arrows representing the X, Y, and Z directions are also illustrated in other drawings as appropriate such that illustration directions correspond to FIG. 1. In the following description, when a direction is specified, a direction indicated by an arrow in each drawing is referred to as "+" and a direction opposite thereto is referred to as "−", and positive and negative signs are used in combination in direction notation. Hereinafter, a +Z direction is also referred to as "up" and a −Z direction is also referred to as "down".

In the embodiment, the torque transmission mechanism 100 is configured as a deceleration device. As illustrated in FIGS. 1 and 2, the torque transmission mechanism 100 includes a first member 130, a second member 150, one or more first rolling members 170, and a first regulating member 190. Furthermore, the torque transmission mechanism 100 in the embodiment includes a first bearing portion 201 and a second bearing portion 202.

The torque transmission mechanism 100 in the embodiment has a cylindrical shape as a whole. The torque transmission mechanism 100 is disposed such that a rotation axis AX of the torque transmission mechanism 100 extends along the Z direction. In the embodiment, the rotation axis AX corresponds to a rotation axis of the first member 130 and a rotation axis of the second member 150. Note that in the present disclosure, the "cylindrical shape" includes a solid cylindrical shape and a hollow cylindrical shape.

Further, hereinafter, a direction along the rotation axis AX is also referred to as a rotation axis AX direction.

A circumferential direction DC of the torque transmission mechanism 100 corresponds to a circumferential direction of the first member 130 and a circumferential direction of the second member 150. In the present disclosure, the circumferential direction DC is defined as a counterclockwise direction when the torque transmission mechanism 100 is viewed from the +Z direction side. In addition, in the following description, unless otherwise specified, "counterclockwise" means counterclockwise when the torque transmission mechanism 100 is viewed from the +Z direction side. Substantially the same applies to "clockwise".

The first member 130 has a cylindrical shape. More specifically, the first member 130 has a hollow cylindrical shape. The first member 130 is disposed such that the axial direction of the first member 130 is along the Z direction. In the embodiment, the first member 130 is disposed innermost in a horizontal direction among portions of the torque transmission mechanism 100. The first member 130 is configured to be rotatable around the rotation axis AX of the torque transmission mechanism 100. As illustrated in FIG. 2, the first member 130 includes an outer peripheral surface 131. The outer peripheral surface 131 is provided with a first groove 132. The first groove 132 has a zigzag shape extending around and going around the rotation axis AX above the outer peripheral surface 131. In the present specification, the "zigzag shape" means a shape, while reciprocating one or more times in a certain direction, extending so as to advance in a direction orthogonal to the certain direction. That is, the zigzag shape has one or more turning points. The turning points of the zigzag shape may be sharp or rounded. Details of the first groove 132 will be described below.

As illustrated in FIGS. 1 and 2, the second member 150 has an annular shape surrounding the first member 130. That is, an inner diameter of the second member 150 is larger than an outer diameter of the first member 130. The second member 150 is disposed such that the axial direction of the second member 150 is along the Z direction. In the embodiment, the second member 150 is disposed outermost in the horizontal direction among the portions of the torque transmission mechanism 100. The second member 150 is configured to be rotatable around the rotation axis AX. As illustrated in FIG. 2, the second member 150 includes an inner peripheral surface 151. The inner peripheral surface 151 is provided with a second groove 152. The second groove 152 has a zigzag shape extending around and going around the rotation axis AX above the inner peripheral surface 151. Details of the second groove 152 will be described below.

Figure 3:
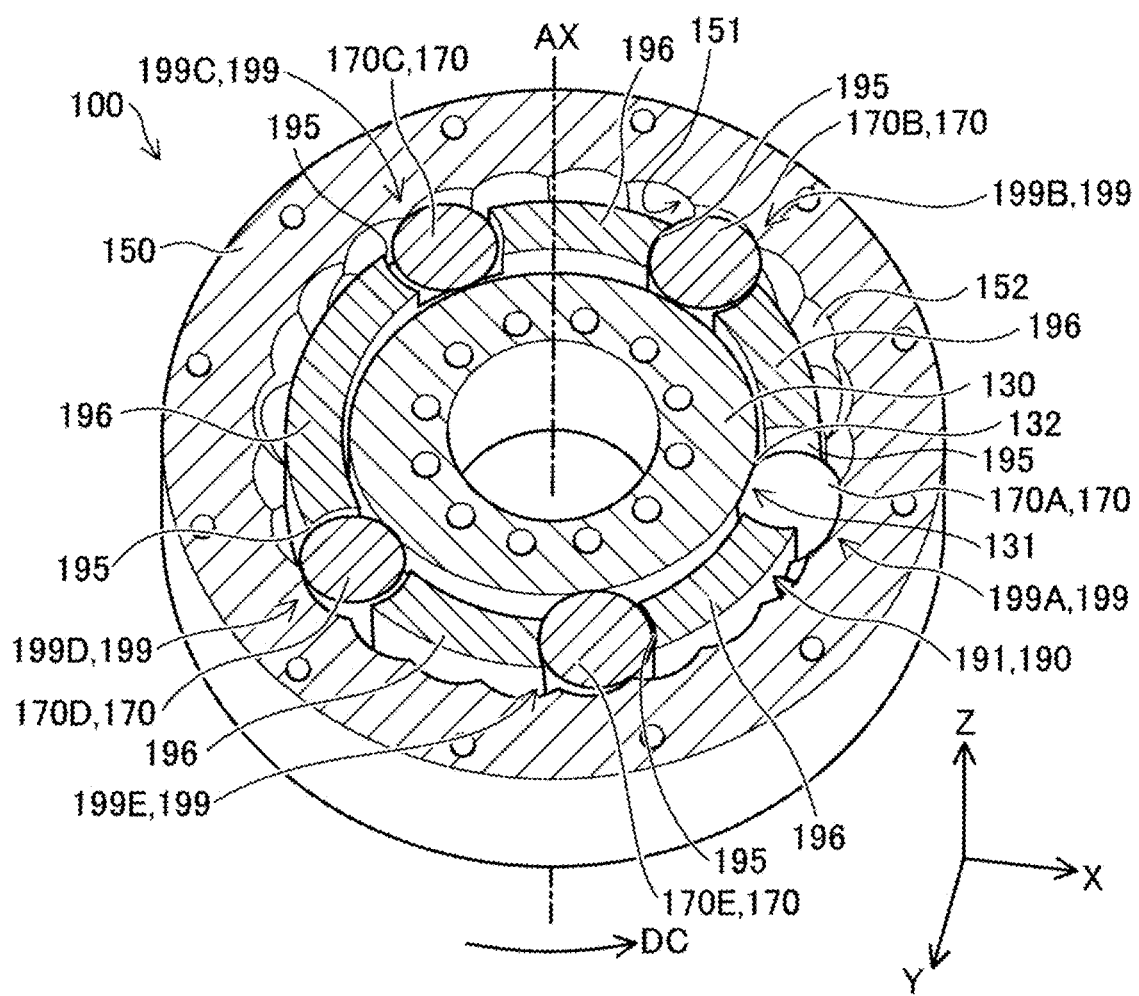
FIG. 3 is a cross-sectional view taken along line III-III in FIG. 1.
Figure 4:
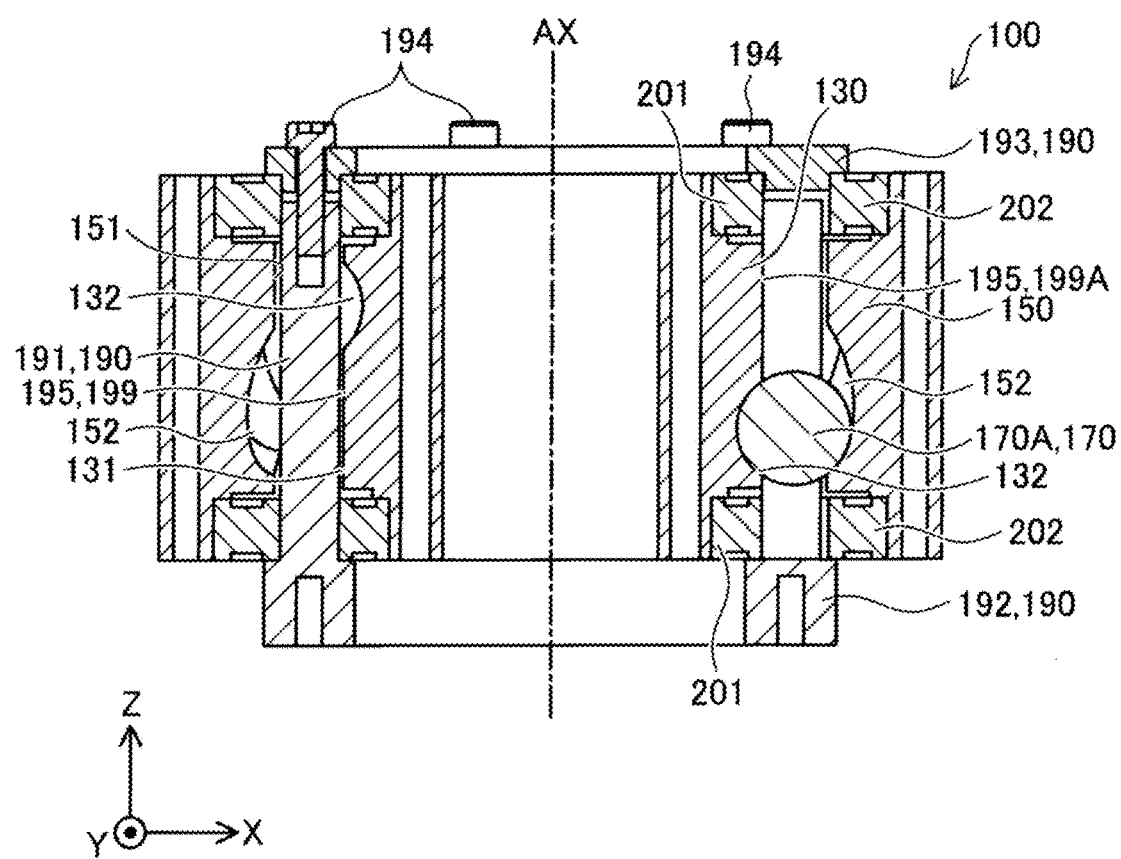
FIG. 4 is a cross-sectional view taken along line IV-IV in FIG. 1.

FIG. 3 is a cross-sectional view taken along line III-III in FIG. 1. FIG. 4 is a cross-sectional view taken along line IV-IV in FIG. 1. As illustrated in FIGS. 3 and 4, the first rolling member 170 is disposed in the first groove 132 and in the second groove 152 between the first member 130 and the second member 150. The first rolling member 170 is configured to be rollable in the first groove 132 and in the second groove 152. Specifically, the first rolling member 170 rolls in the first groove 132 and in the second groove 152 so as to be disposed at a position where the first groove 132 and the second groove 152 intersect with each other when viewed along a radial direction of the torque transmission mechanism 100. When the first rolling member 170 rolls in the first groove 132, the first rolling member 170 and the first member 130 move relative to each other. Further, when the first rolling member 170 rolls in the second groove 152, the first rolling member 170 and the second member 150 move relative to each other. The first rolling member 170 in the embodiment has a spherical shape. The first rolling member 170 is configured as a so-called steel ball, for example, and is made of stainless steel, steel, or the like. As described below, the first rolling member 170 transmits torque between the first member 130 and the second member 150.

In the embodiment, the first rolling members 170 include a rolling member 170A, a rolling member 170B, a rolling member 170C, a rolling member 170D, and a rolling member 170E. When the rolling members from the rolling members 170A to 170E are not distinguished from each other, each of the rolling members is simply referred to as the first rolling member 170. The rolling members 170A, 170B, 170C, 170D, and 170E are disposed in this order in the circumferential direction DC when the torque transmission mechanism 100 is viewed from the +Z direction side.

As illustrated in FIGS. 3 and 4, the first regulating member 190 is disposed between the first member 130 and the second member 150. In the embodiment, the first regulating member 190 has a hollow cylindrical shape as a whole. The first regulating member 190 is disposed such that an axial direction of the first regulating member 190 is along the Z direction.

The first regulating member 190 includes a main body portion 191, a first flange portion 192, and a second flange portion 193. The main body portion 191 is a portion of the first regulating member 190 that is disposed inside an annulus of the second member 150. The first flange portion 192 is an annular flange portion constituting a lower end portion of the first regulating member 190. The second flange portion 193 is an annular flange portion constituting an upper end portion of the first regulating member 190. As illustrated in FIGS. 1 and 4, the first flange portion 192 is not disposed inside the annulus of the second member 150, but is disposed below a lower end portion of the first member 130 and a lower end portion of the second member 150. In substantially the same manner, the second flange portion 193 is disposed above an upper end portion of the first member 130 and an upper end portion of the second member 150. In the embodiment, the first flange portion 192 is formed integrally with the main body portion 191. The second flange portion 193 is configured as a cap being a body separate from the main body portion 191, and is fixed to the main body portion 191 via a bolt 194. An outer diameter of the main body portion 191 is smaller than the inner diameter of the second member 150. On the other hand, outer diameters of the first flange portion 192 and the second flange portion 193 are larger than an inner diameter of a second portion. An inner diameter of the main body portion 191 is larger than the outer diameter of the first member 130. On the other hand, inner diameters of the first flange portion 192 and the second flange portion 193 are smaller than the outer diameter of the first member 130. The inner diameter of the first flange portion 192 is substantially the same as the inner diameter of the second flange portion 193. The outer diameter of the first flange portion 192 is substantially the same as the outer diameter of the second flange portion 193.

As illustrated in FIGS. 2 to 4, the main body portion 191 includes a slit portion 195. In the embodiment, the main body portion 191 includes five slit portions 195. An opening portion is configured so as to extend along the rotation axis AX, that is, along the Z direction. A wall portion 196 of the main body portion 191 is disposed between openings of the slit portions 195. The wall portion 196 corresponds to a wall in the circumferential direction DC among walls defining the opening of the slit portion 195. As illustrated in FIGS. 2 and 4, in the embodiment, a lower end of the opening of the slit portion 195 is defined by the first flange portion 192. Additionally, as illustrated in FIG. 4, an upper end of the opening of the slit portion 195 is defined by the second flange portion 193. An opening width of the opening of the slit portion 195 in the circumferential direction DC is slightly larger than a diameter of the first rolling member 170. Further, an opening length of the slit portion 195 in the Z direction is larger than the opening width of the slit portion 195.

The first regulating member 190 includes a first regulating portion 199. The first regulating portion 199 allows movement of the first rolling member 170 along the rotation axis AX, that is, movement in the Z direction. On the other hand, the first regulating portion 199 regulates movement of the first rolling member 170 around the rotation axis AX. In the embodiment, the first regulating portion 199 includes a regulating portion 199A, a regulating portion 199B, a regulating portion 199C, a regulating portion 199D, and a regulating portion 199E. Hereinafter, when the regulating portions 199A to 199E are not distinguished from each other, each regulating portion is simply referred to as the first regulating portion 199. Further, the first regulating portion 199 is also simply referred to as a regulating portion.

Specifically, in the embodiment, the first regulating portion 199 includes the above-described slit portion 195, and achieves the allowance and regulation of movement of the first rolling member 170 by the slit portion 195. For example, the rolling member 170A is disposed in the slit portion 195 of the regulating portion 199A. As a result, movement of the rolling member 170A in the Z direction along the slit portion 195 is allowed. On the other hand, movement of the rolling member 170A around the rotation axis AX is regulated by the wall portion 196 defining the slit portion 195. Similarly, the rolling members 170B to 170E are disposed in the slit portions 195 of the regulating portions 199B to the regulating portion 199E, respectively. Note that the number of first rolling members 170 may be determined in consideration of, for example, strength of the first regulating member 190. Specifically, as the number of first rolling members 170 increases, a total opening area of the slit portions 195 in the first regulating member 190 increases, and the strength of the first regulating member 190 may decrease. The number of first rolling members 170 may be set to a number small enough to suppress such a decrease in strength.

The first bearing portion 201 is disposed between the first member 130 and the first regulating member 190. The first bearing portion 201 holds the first member 130 so as to be rotatable around the rotation axis AX with respect to the first regulating member 190. The first bearing portion 201 is configured with various bearings such as a ball bearing and a needle bearing, for example. In the embodiment, two first bearing portions 201 are provided. The first bearing portions 201 are press-fitted and fixed to an outer side of the upper end portion and an outer side of the lower end portion of the first member 130, respectively, and pivotally support the upper end portion and the lower end portion of the first member 130, respectively. The first bearing portion 201 on the lower end portion side of the first member 130 is disposed inside the main body portion 191 so as to be in contact with an upper surface of the first flange portion 192. The first bearing portion 201 on the upper end portion side of the first member 130 is disposed inside the main body portion 191 so as to be in contact with a lower surface of the second flange portion 193. As a result, while movement of the first member 130 in the Z direction with respect to the first regulating member 190 is regulated, the first member 130 is held so as to be rotatable with respect to the first regulating member 190.

The second bearing portion 202 is disposed between the second member 150 and the first regulating member 190. The second bearing portion 202 holds the second member 150 so as to be rotatable around the rotation axis AX with respect to the first regulating member 190. Similarly to the first bearing portion 201, the second bearing portion 202 is configured with various bearings, for example. In the embodiment, two second bearing portions 202 are provided. The second bearing portions 202 are press-fitted and fixed to an inner side of the upper end portion and an inner side of the lower end portion of the second member 150, respectively, and pivotally support the upper end portion and the lower end portion of the second member 150, respectively. The second bearing portion 202 on the lower end portion side of the second member 150 is disposed outside the main body portion 191 so as to be in contact with the upper surface of the first flange portion 192. The second bearing portion 202 on the upper end portion side of the second member 150 is disposed outside the main body portion 191 so as to be in contact with the lower surface of the second flange portion 193. As a result, while movement of the second member 150 in the z direction with respect to the first regulating member 190 is regulated, the second member 150 is held so as to be rotatable with respect to the first regulating member 190.

Figure 5:
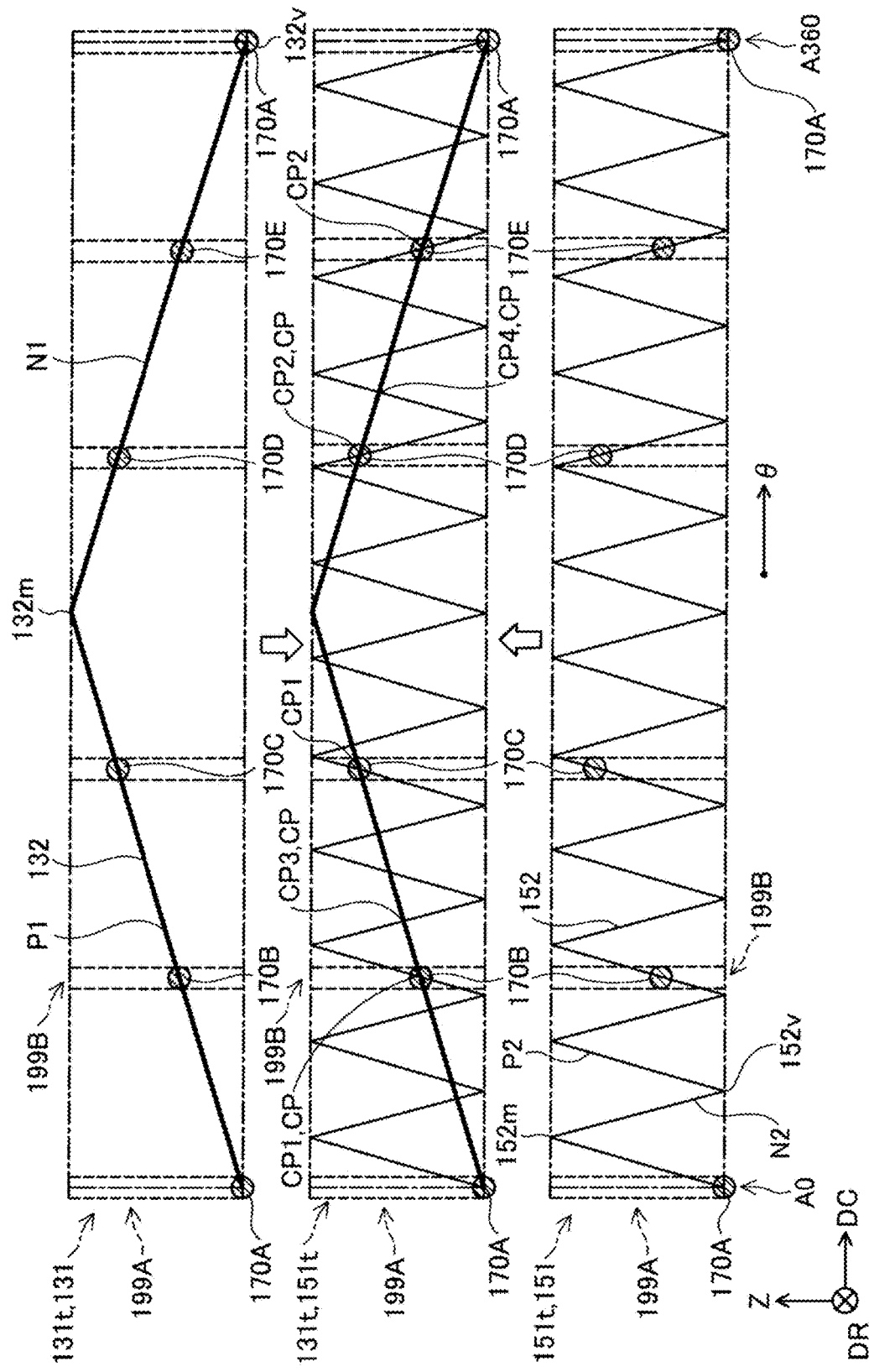
FIG. 5 is a first explanatory view of the torque transmission mechanism in the first embodiment.

FIG. 5 is a first explanatory view of the torque transmission mechanism 100. FIG. 5 illustrates an outer peripheral surface 131$t$ and an inner peripheral surface 151$t$. The outer peripheral surface 131$t$ corresponds to the spread outer peripheral surface 131. The inner peripheral surface 151$t$ corresponds to the spread inner peripheral surface 151. FIG. 5 illustrates a state in which the outer peripheral surface 131$t$ and the inner peripheral surface 151$t$ are overlaid with each other. In addition, in FIG. 5, each first regulating portion 199 is schematically illustrated by a broken line. In addition, in FIG. 5, each first rolling member 170 is schematically illustrated by hatching.

FIG. 5 illustrates an angle θ at the outer peripheral surface 131 and the inner peripheral surface 151. The angle θ increases as a distance in the circumferential direction DC increases. An angular position A0 for 0 degrees and an angular position A360 for 360 degrees illustrated in FIG. 5 are positions identical to each other. In the embodiment, the regulating portion 199A is positioned at the angular position A0. In FIG. 5, in order to make the technique easier to understand, the rolling member 170A and the regulating portion 199A are illustrated in each of a vicinity of the angular position A0 and a vicinity of the angular position A360. However, in actuality, the number of rolling member 170A and the number of regulating portion 199A are one.

In FIG. 5, the first groove 132 is indicated by a thick line. The first groove 132 has a closed ring shape that goes around the outer peripheral surface 131 along the circumferential direction DC. The first groove 132 as a whole has a periodic wave shape that advances along the circumferential direction DC while reciprocating on the outer peripheral surface 131 in the Z direction. That is, when the first groove 132 is regarded as a wave, a traveling direction of the first groove 132 is a direction along the circumferential direction DC, and a vibration direction of the first groove 132 is the Z direction.

Specifically, the first groove 132 has a triangular wave shape. The first groove 132 has one period. That is, the first groove 132 includes one mountain portion 132$m$ and one valley portion 132v. The mountain portion 132m and the valley portion 132v have a pointed shape. A position of each mountain portion 132m in the Z direction is substantially the same. Further, a position of each valley portion 132v in the Z direction is substantially the same. That is, when the first groove 132 is regarded as a wave, amplitude of the first groove 132 is substantially constant. Each of the mountain portion and the valley portion corresponds to the turning point of the zigzag shape described above. Note that in the embodiment, the mountain portion is positioned on the +Z direction side of the valley portion. In other embodiments, the positional relationship between the mountain portion and the valley portion may be reversed.

The second groove 152 has a closed ring shape that goes around the inner peripheral surface 151 in the circumferential direction DC. The second groove 152 as a whole has a periodic wave shape that advances along the circumferential direction DC while reciprocating on the inner peripheral surface 151 in the Z direction. That is, when the second groove 152 is regarded as a wave, a traveling direction of the second groove 152 is a direction along the circumferential direction DC, and a vibration direction of the second groove 152 is the Z direction. Specifically, the second groove 152 has a triangular wave shape. The second groove 152 has a period different from that of the first groove 132. Specifically, the second groove 152 has twelve periods. That is, the second groove 152 includes twelve mountain portions 152m and twelve valley portions 152v. The mountain portion 152m and the valley portion 152v have a pointed shape. The position of each mountain portion 152m in the Z direction is substantially the same, and is substantially the same as the position of each mountain portion 132m in the Z direction. Further, the position of each valley portion 152v in the Z direction is substantially the same as each other, and is substantially the same as the position of each valley portion 132v in the Z direction. That is, when the second groove 152 is regarded as a wave, amplitude of the second groove 152 is substantially constant and substantially the same as the amplitude of the first groove 132.

In the embodiment, in the torque transmission mechanism 100, one of the first member 130 and the second member 150 is used as an input shaft, and another is used as an output shaft. Hereinafter, operation of the torque transmission mechanism 100 when the first member 130 is used as the input shaft will be described.

Figure 6:
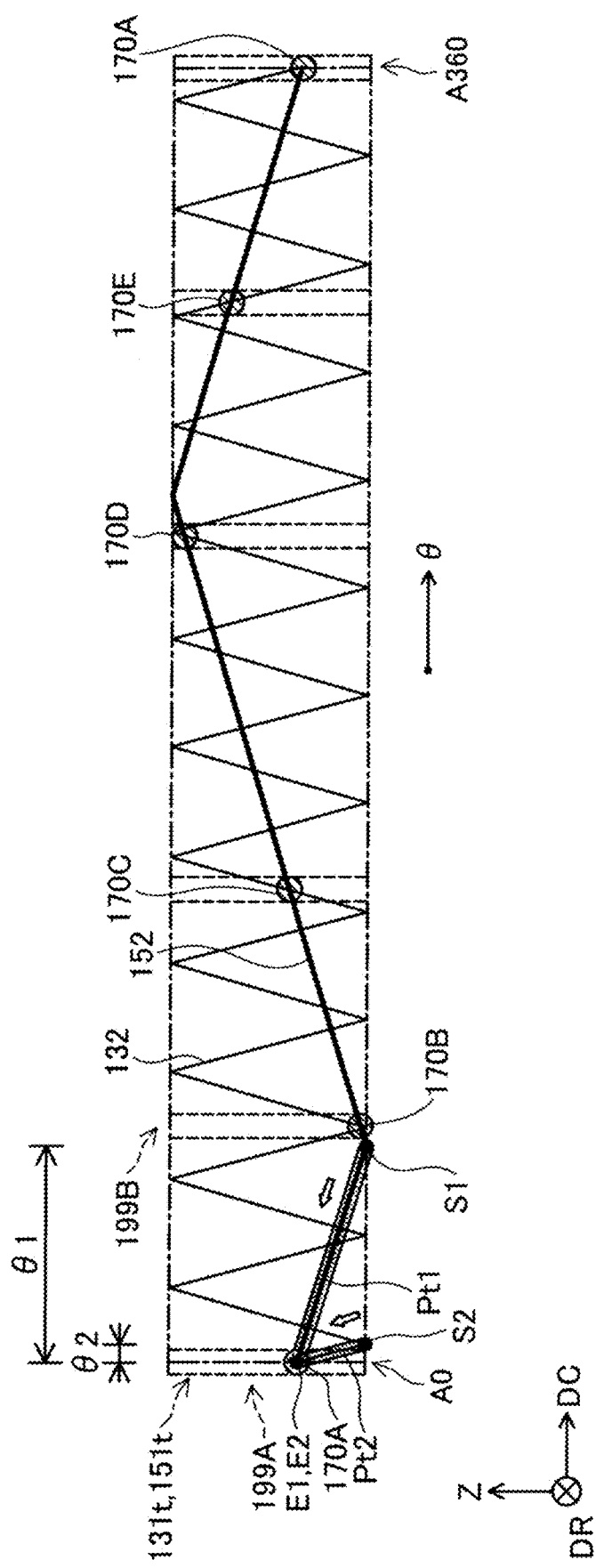
FIG. 6 is a second explanatory view of the torque transmission mechanism in the first embodiment.

FIG. 6 is a second explanatory view of the torque transmission mechanism 100. FIG. 6 illustrates a state in which the first member 130 as the input shaft rotates in the circumferential direction DC around the rotation axis AX by a rotation angle θ1 from the state illustrated in FIG. 5. In the example in FIG. 6, the rotation angle θ1 is 60 degrees.

As illustrated in FIG. 6, when the first member 130 rotates around the rotation axis AX, each first rolling member 170 rolls in the first groove 132 and in the second groove 152. To be specific, by the rotation of the first member 130, the first rolling member 170 rolls on a path Pt1 in the first groove 132. The path Pt1 is such a path that a length of the path Pt1 in the circumferential direction DC corresponds to the rotation angle θ1. To be specific, the path Pt1 is such a path that a position of the first rolling member 170 before the first member 130 starts to rotate is a start point S1, and a position advanced from the start point in the circumferential direction DC by an amount corresponding to the rotation angle θ1 is an end point E1, in the first groove 132. In FIG. 6, as an example of the path Pt1, the path Pt1 with respect to the rolling member 170A is indicated by dot-pattern hatching. When the first rolling member 170 rolls on the path Pt1, the movement of the first rolling member 170 around the rotation axis AX is regulated, so that the first rolling member 170 moves only in the Z direction along the first groove 132. As a result, while a position of the first rolling member 170 in the circumferential direction DC does not change, a position of the first rolling member 170 in the Z direction changes in accordance with a position of the path Pt1 in the Z direction. In addition, the first rolling member 170 rolls on a path Pt2 in the second groove 152 while moving in the Z direction as described above, to transmit torque to the second member 150 via the second groove 152, and rotates the second member 150 around the rotation axis AX. The path Pt2 is such a path that a positional change of the first rolling member 170 in the rotation axis AX direction when passing through the path Pt2 is the same as a positional change of the first rolling member 170 in the rotation axis AX direction when passing through the path Pt1. In FIG. 6, as an example of the path Pt2, the path Pt2 with respect to the rolling member 170A is indicated by dot-pattern hatching. As a result, the second member 150 rotates around the rotation axis AX by a rotation angle θ2 corresponding to a length of the path Pt2 in the circumferential direction DC, that is, a length between a start point S2 and an end point E2 of the path Pt2 in the circumferential direction DC. A ratio of the rotation angle θ2 to the rotation angle θ1 corresponds to a ratio of a period T1 of the first groove 132 to a period T2 of the second groove 152. That is, a deceleration ratio RR1a in this case corresponds to a value obtained by dividing the period T1 by the period T2. Note that as indicated by a white arrow in FIG. 6, it can be said that the first rolling member 170 such as the rolling member 170A moves in the first groove 132 and in the second groove 152 relative to the first member 130 and the second member 150 in a direction opposite to a rotation direction of the first member 130 and the second member 150.

Operation of the torque transmission mechanism 100 when the second member 150 is used as the input shaft is substantially the same as the operation of the torque transmission mechanism 100 when the first member 130 is used as the input shaft. In this case, the first rolling member 170 rolls in the first groove 132 by rotation of the second member 150, to transmit torque to the first member 130 via the first groove 132. Further, a deceleration ratio RR1b in this case corresponds to a value obtained by dividing the period T2 by the period T1. That is, in this case, rotation input to the torque transmission mechanism 100 via the second member 150 is accelerated via the first member 130 and output.

As illustrated in FIG. 5, the respective first rolling members 170 are disposed at crossing positions CP where the first groove 132 and the second groove 152 intersect with each other when viewed along a radial direction DR. The crossing positions CP include a first crossing position CP1, a second crossing position CP2, a third crossing position CP3, and a fourth crossing position CP4. The first crossing position CP1 is a position where a first positive portion P1 and a second positive portion P2 intersect with each other. The first positive portion P1 is a portion of the first groove 132 that extends from the valley portion 132v toward the mountain portion 132m, to a forward direction side in the circumferential direction DC. The second positive portion P2 is a portion of the second groove 152 that extends from the valley portion 152v toward the mountain portion 152m, to the forward direction side in the circumferential direction DC. The second crossing position CP2 is a position where a first negative portion N1 and a second negative portion N2 intersect with each other. The first negative portion N1 is a portion of the first groove 132 that extends from the mountain portion 132m toward the valley portion 132v, to the forward direction side in the circumferential direction DC. The second negative portion N2 is a portion of the second groove 152 that extends from the mountain portion 152m toward the valley portion 152v, to the forward direction side in the circumferential direction DC. The third crossing position CP3 is a position where the first positive portion P1 and the second negative portion N2 intersect with each other. The fourth crossing position CP4 is a position where the first negative portion N1 and the second positive portion P2 intersect with each other. Note that each of the first positive portion P1 and the first negative portion N1 includes a peak of the mountain portion 132m and a peak of the valley portion 132v. Further, each of the second positive portion P2 and the second negative portion N2 includes a peak of the mountain portion 152m and a peak of the valley portion 152v.

In the embodiment, each first rolling member 170 is disposed at the first crossing position CP1 or the second crossing position CP2. As a result, the rotation directions of the first member 130 and the second member 150 coincide with each other. Note that in the other embodiments, each first rolling member 170 may be disposed at the third crossing position CP3 or the fourth crossing position CP4. In this case, the rotation direction of the first member 130 and the rotation direction of the second member 150 are opposite to each other.

According to the torque transmission mechanism 100 in the embodiment described above, the first rolling member 170 disposed in the first groove 132 of the first member 130 and in the second groove 152 of the second member 150 is configured to be rollable in the first groove 132 and in the second groove 152. In the first groove 132 and in the second groove 152, the movement of the first rolling member 170 along the rotation axis AX is allowed, and the movement of the first rolling member 170 around the rotation axis AX is regulated. Therefore, torque can be transmitted between the first member 130 and the second member 150 without using a pin for torque transmission.

In addition, in the embodiment, the number of mountain portions 132m and the number of valley portions 132v of the first groove 132 are different from the number of mountain portions 152m and the number of valley portions 152v of the second groove 152, respectively. According to this aspect, it is possible to decelerate a rotation speed between the first member 130 and the second member 150 in accordance with the number of mountain portions 132m and the number of valley portions 132v of the first groove 132 and the number of mountain portions 152m and the number of valley portions 152v of the second groove 152. That is, the rotation speed can be decelerated between the first member 130 and the second member 150 in accordance with a difference between the period T1 of the first groove 132 and the period T2 of the second groove 152. Further, in the embodiment, various deceleration ratios can be achieved with high flexibility by optionally changing the combination of the period T1 and the period T2.

In addition, in the embodiment, the first rolling member 170 has a spherical shape. Therefore, the first rolling member 170 can be more smoothly rolled in the first groove 132 and in the second groove 152. Additionally, as a result, wear of the first member 130, the second member 150, the first rolling member 170, and the first regulating member 190 can be suppressed.

In addition, in the embodiment, the first rolling member 170 includes one rolling member 170A and another rolling member 170B. With this configuration, torque can be transmitted between the first member 130 and the second member 150 using the rolling member 170A and the rolling member 170B. Therefore, for example, it is possible to reduce a load for each first rolling member 170 as compared with an embodiment in which the rolling member 170A is provided.

In addition, as in the embodiment, since the plurality of first rolling members 170 are provided, it is easy to uniquely determine a rotation direction of the second member 150 with respect to the first member 130 or a rotation direction of the first member 130 with respect to the second member 150. To be specific, for example, in a case where only the rolling member 170A is provided, when the rolling member 170A approaches the mountain portion 152m or the valley portion 152v of the second groove 152 due to the rotation of first member 130 as the input shaft, the rolling member 170A may advance in the second groove 152 toward either one side or another side in the circumferential direction DC. As a result, since the second member 150 may rotate both in the forward direction of the circumferential direction DC and in a backward direction of the circumferential direction DC, there is a possibility that a phenomenon occurs in which the second member 150 reciprocates in a closed space in the circumferential direction DC. Such a phenomenon is likely to occur particularly when the rotation speed of the first member 130 or the second member 150 is low. Note that such a phenomenon may also similarly occur when the second member 150 is used as the input shaft. On the other hand, in a case where the rolling member 170B is provided in addition to the rolling member 170A, for example, when the rolling member 170A approaches the mountain portion 152m or the valley portion 152v, the rolling member 170B can be positioned at a portion other than the mountain portion 152m and the valley portion 152v of the second groove 152. In this case, since a movement direction of the rolling member 170B in the second groove 152 is uniquely determined, the movement direction of the rolling member 170B in the second groove 152 and the rotation direction of the second member 150 are also uniquely determined.

Further, in the embodiment, it is possible to more smoothly rotate the first member 130 with respect to the first regulating member 190 via the first bearing portion 201 disposed between the first member 130 and the first regulating member 190.

Further, in the embodiment, it is possible to more smoothly rotate the second member 150 with respect to the first regulating member 190 via the second bearing portion 202 disposed between the second member 150 and the first regulating member 190.

In addition, in the embodiment, each of the first groove 132 and the second groove 152 has a triangular wave shape. Therefore, at each position in the first groove 132 and each position in the second groove 152, an amount of movement of the first rolling member 170 in the Z direction per unit rotation angle of each of the first member 130 and the second member 150 is substantially constant, so that the first member 130 can be more stably rotated with respect to the second member 150 or the second member 150 can be more stably rotated with respect to the first member 130. As a result, more stable deceleration can be achieved between the first member 130 and the second member 150. In addition, as compared to a case where the first groove 132 or the second groove 152 has a zigzag shape having a rounded mountain portion or a valley portion, such as a sinusoidal shape, for example, it is possible to further increase torque transmission efficiency in the mountain portion or the valley portion. As a result, torque can be more efficiently transmitted between the first member 130 and the second member 150.

B. Second Embodiment

Figure 7:
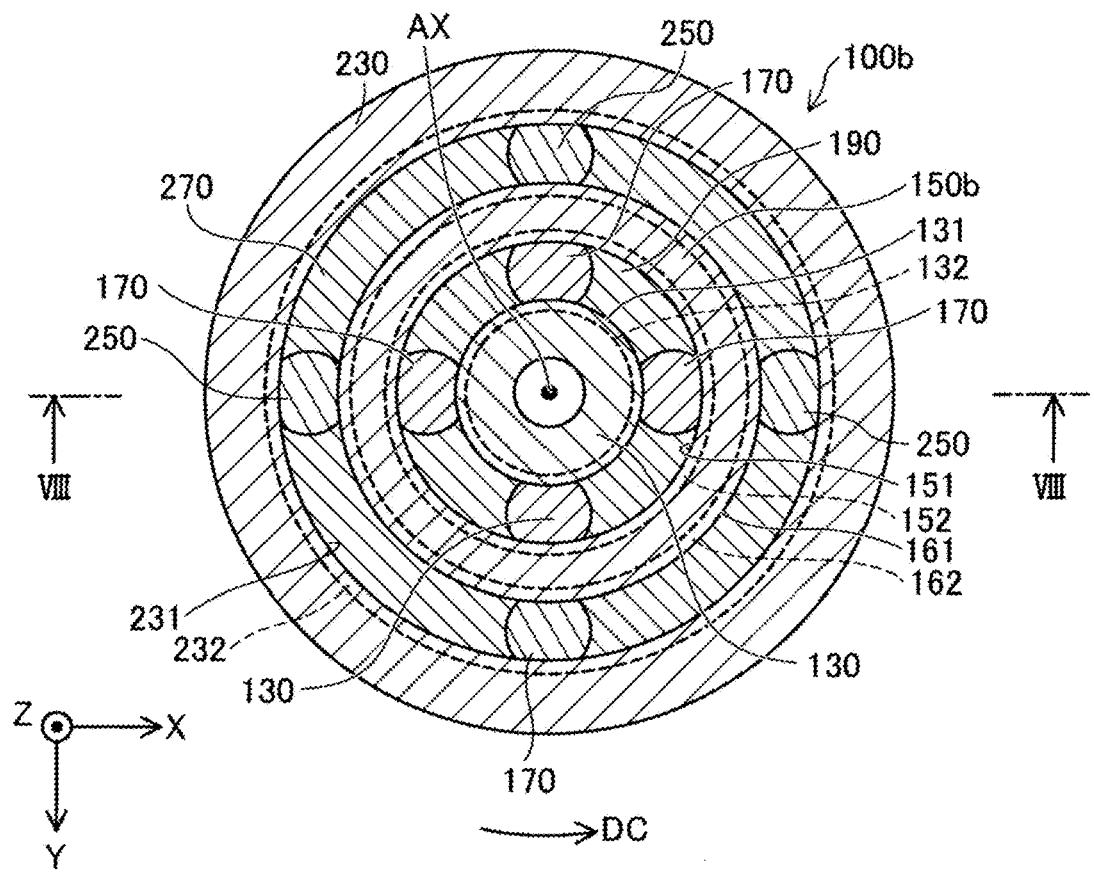
FIG. 7 is a cross-sectional view schematically illustrating a schematic configuration of a torque transmission mechanism in a second embodiment.
Figure 8:
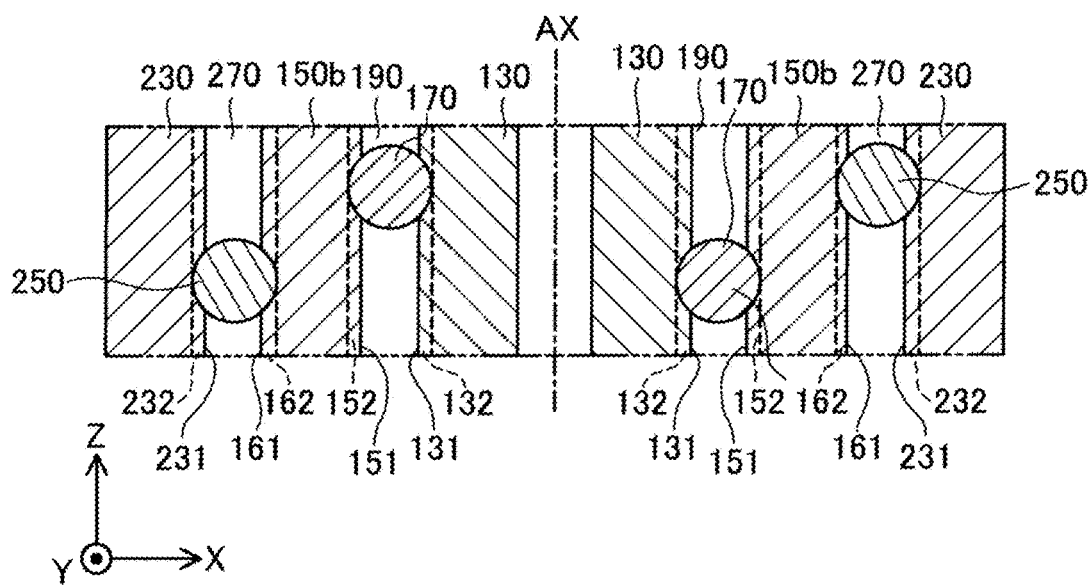
FIG. 8 is a cross-sectional view taken along line VIII-VIII in FIG. 7.

FIG. 7 is a cross-sectional view schematically illustrating a schematic configuration of a torque transmission mechanism 100b in a second embodiment. FIG. 8 is a cross-sectional view taken along line VIII-VIII in FIG. 7. FIG. 7 illustrates a cross-section of the torque transmission mechanism 100b taken along the X direction and the Y direction. FIG. 8 illustrates a cross-section of the torque transmission mechanism 100b taken along the X direction and the Z direction. As illustrated in FIGS. 7 and 8, in the embodiment, unlike the first embodiment, an outer peripheral surface 161 of a second member 150b is provided with a third groove 162. Further, the torque transmission mechanism 100b further includes a third member 230, one or more second rolling members 250, and a second regulating member 270. Points for the torque transmission mechanism 100b in the embodiment that are not particularly described are the same as those in the first embodiment. Note that FIGS. 7 and 8 illustrate an example in which each of the number of first rolling members 170 and the number of second rolling members 250 is four. In addition, in FIGS. 7 and 8, each of the first groove 132, the second groove 152, and the third groove 162 is schematically illustrated by a broken line. In addition, in FIGS. 7 and 8, for example, the members such as the first bearing portion 201 and the second bearing portion 202 are omitted as appropriate.

The third groove 162 has a zigzag shape extending around and going around the rotation axis AX on the outer peripheral surface 161. The third groove 162 is configured in substantially the same manner as the first groove 132, for example. In the embodiment, the third groove 162 has a closed ring shape that goes around the outer peripheral surface 161 in the circumferential direction DC. The third groove 162 as a whole has a periodic wave shape that advances along the circumferential direction DC while reciprocating along the rotation axis AX on the outer peripheral surface 161.

Specifically, the third groove 162 has a triangular wave shape. A period T3 of the third groove 162 may be the same as or different from the period T1 or the period T2. The period T3 in the embodiment is one. A position of each mountain portion in the Z direction of the third groove 162 is substantially the same. Further, a position of each valley portion in the Z direction of the third groove 162 is substantially the same.

As illustrated in FIG. 7, the third member 230 has an annular shape surrounding the second member 150b. That is, an inner diameter of the third member 230 is larger than an outer diameter of the second member 150. In the embodiment, the third member 230 is disposed outermost in the horizontal direction among respective portions of the torque transmission mechanism 100b. The third member 230 is configured to be rotatable around the rotation axis AX. As illustrated in FIGS. 7 and 8, the third member 230 includes an inner peripheral surface 231. The inner peripheral surface 231 is provided with a fourth groove 232.

The fourth groove 232 has a zigzag shape extending around and going around the rotation axis AX on the inner peripheral surface 231. The fourth groove 232 is configured in substantially the same manner as the second groove 152, for example. The fourth groove 232 has a closed ring shape that goes around the inner peripheral surface 231 in the circumferential direction DC. The fourth groove 232 as a whole has a periodic wave shape that advances along the circumferential direction DC while reciprocating along the rotation axis AX on the inner peripheral surface 231.

Specifically, the fourth groove 232 has a triangular wave shape. The fourth groove 232 has a period T4 different from the period T3. That is, the number of mountain portions and the number of valley portions of the third groove 162 are different from the number of mountain portions and the number of valley portions of the fourth groove 232, respectively. The period T4 may be the same as or different from the period T1 or the period T2. In the embodiment, a magnitude relationship between the period T4 and the period T3 is the same as a magnitude relationship between the period T2 and the period T1. To be specific, the period T4 in the embodiment is twelve. A position of each mountain portion of the fourth groove 232 in the Z direction is substantially the same, and is substantially the same as the position of each mountain portion of the third groove 162 in the Z direction. Further, a position of each valley portion of the fourth groove 232 in the Z direction is substantially the same, and is substantially the same as the positions of each valley portion of the third groove 162 in the Z direction.

The second rolling member 250 is configured in substantially the same manner as the first rolling member 170, for example. The second rolling member 250 is disposed in the third groove 162 and in the fourth groove 232 between the second member 150b and the third member 230. The second rolling member 250 is configured to be rollable in the third groove 162 and in the fourth groove 232. To be specific, the second rolling member 250 rolls in the third groove 162 and in the fourth groove 232 so as to be disposed at a position where the third groove 162 and the fourth groove 232 intersect with each other when viewed along a radial direction of the torque transmission mechanism 100b. The second rolling member 250 in the embodiment has a spherical shape similarly to the first rolling member 170. The second rolling member 250 transmits torque between the second member 150b and the third member 230.

The second regulating member 270 is configured in substantially the same manner as the first regulating member 190, for example. In the embodiment, the second regulating member 270 has a hollow cylindrical shape as a whole. The second regulating member 270 is disposed between the second member 150b and the third member 230. The second regulating member 270 allows movement of the second rolling member 250 along the rotation axis AX, and regulates movement of the second rolling member 250 around the rotation axis AX. Note that, for example, substantially the same bearing portion as the first bearing portion 201 or the second bearing portion 202 may be disposed between the second regulating member 270 and the second member 150b, and between the second regulating member 270 and the third member 230. That is, such a bearing portion holds the second member 150b or the third member 230 so as to be rotatable around the rotation axis AX with respect to the second regulating member 270.

In the embodiment, similarly to the first embodiment, deceleration via the first rolling member 170 is achieved between the first member 130 and the second member 150b. Furthermore, in the embodiment, deceleration via the second rolling member 250 is achieved between the second member 150b and the third member 230. The behavior of the third member 230 with respect to the second member 150b is substantially the same as the behavior of the second member 150b with respect to the first member 130. For example, when the first member 130 is used as the input shaft, the deceleration ratio RR1a is achieved between the first member 130 and the second member 150b, and a deceleration ratio RR2a is achieved between the second member 150b and the third member 230. The deceleration ratio RR2a corresponds to a value obtained by dividing the period T3 by the period T4. As a result, a deceleration ratio RR3a is achieved between the first member 130 as the input shaft and the third member 230 as the output shaft. The deceleration ratio RR3a corresponds to a product of the deceleration ratio RR1a and the deceleration ratio RR2a. Further, when the third member 230 is used as the input shaft, a deceleration ratio RR2b is achieved between the third member 230 and the second member 150b, and the deceleration ratio RR1b is achieved between the second member 150b and the first member 130. The deceleration ratio RR2b corresponds to a value obtained by dividing the period T4 by the period T3. As a result, a deceleration ratio RR3b is achieved between the third member 230 as the input shaft and the first member 130 as the output shaft. The deceleration ratio RR3b corresponds to a product of the deceleration ratio RR1b and the deceleration ratio RR2b. That is, in this case, rotation input to the torque transmission mechanism 100b is accelerated and output.

According to the torque transmission mechanism 100b in the second embodiment described above, the second rolling member 250 disposed in the third groove 162 provided at the outer peripheral surface 161 of the second member 150b and in the fourth groove 232 provided at the inner peripheral surface 231 of the third member 230 surrounding the second member 150b is configured to be rollable in the third groove 162 and in the fourth groove 232. The movement of the second rolling member 250 along the rotation axis AX is allowed, and the movement of the second rolling member 250 around the rotation axis AX is regulated. The number of mountain portions and the number of valley portions of the third groove 162 are different from the number of the mountain portions and the number of valley portions of the fourth groove 232, respectively. With this configuration, it is possible to decelerate a rotation speed in a stepwise manner between the first member 130 and the second member 150b, and between the second member 150b and the third member 230. Therefore, for example, a higher deceleration ratio can be achieved without excessively increasing the period of the second groove 152 or the fourth groove 232. As a result, for example, it is possible to suppress an increase in size of the second member 150b or the third member 230 with an increase in the period of the second groove 152 or the fourth groove 232, and thus it is possible to achieve a higher deceleration ratio while configuring the torque transmission mechanism 100b in a more space-saving manner. In addition, for example, it is possible to suppress an excessive reduction in size of the first rolling member 170 or the second rolling member 250 with an increase in the period of the second groove 152 or the fourth groove 232, therefore, it is possible to achieve a higher deceleration ratio while suppressing a decrease in durability of the torque transmission mechanism 100b. Note that in the other embodiment, for example, a fourth member may be provided outside the third member 230 so as to achieve further stepwise deceleration.

C. Third Embodiment

Figure 9:
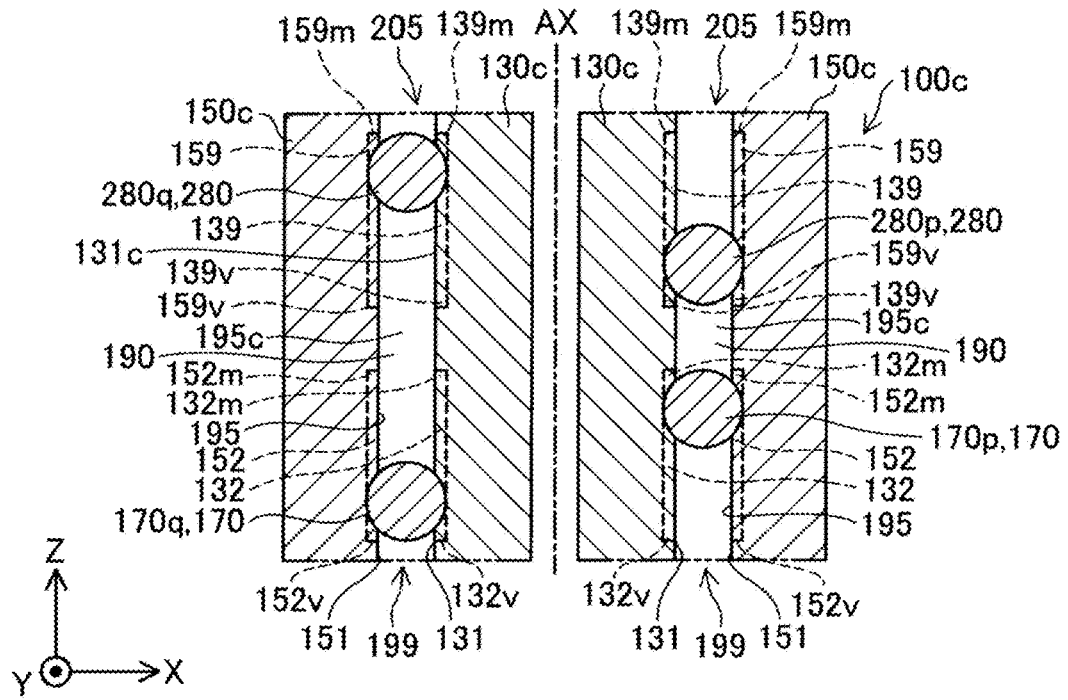
FIG. 9 is a cross-sectional view schematically illustrating a schematic configuration of a torque transmission mechanism in a third embodiment.

FIG. 9 is a cross-sectional view schematically illustrating a schematic configuration of a torque transmission mechanism 100c in a third embodiment. In substantially the same manner as FIG. 8, FIG. 9 illustrates a cross-section of the torque transmission mechanism 100c along the X direction and the Z direction. In the embodiment, unlike the first embodiment, an outer peripheral surface 131c of a first member 130c is provided with a first corresponding groove 139. Additionally, an inner peripheral surface 151c of a second member 150c is provided with a second corresponding groove 159. One or more third rolling member 280 are disposed in the first corresponding groove 139 and in the second corresponding groove 159. Further, the first regulating member 190 includes a second regulating portion 205. Points for the torque transmission mechanism 100c in the embodiment that are not particularly described are the same as those in the first embodiment.

The first corresponding groove 139 is arranged side by side with the first groove 132 in the Z direction. In the embodiment, the first corresponding groove 139 is disposed on the +Z direction side of the first groove 132. The first corresponding groove 139 is a groove corresponding to the first groove 132 and has a zigzag shape corresponding to the first groove 132. Specifically, the first corresponding groove 139 has the same period as the first groove 132. That is, the first corresponding groove 139 has a periodic wave shape including the same number of mountain portions 139m and valley portions 139v as the mountain portions 132m and valley portions 132v of the first groove 132. In the embodiment, the first groove 132 and the first corresponding groove 139 are disposed such that the mountain portion 132m of the first groove 132 and the valley portion 139v of the first corresponding groove 139 face each other. Note that, in the first member 130c, for example, a portion provided with the first groove 132 and a portion provided with the first corresponding groove 139 may be configured as bodies separated from each other, and both the portions stacked at each other may be fixed to each other to configure the first member 130c.

The second corresponding groove 159 is disposed side by side with the second groove 152 in the Z direction. In the embodiment, the second corresponding groove 159 is disposed on the +Z direction side of the second groove 152. The second corresponding groove 159 is a groove corresponding to the second groove 152 and has a zigzag shape corresponding to the second groove 152. Specifically, the second corresponding groove 159 has the same period as the second groove 152. That is, the second corresponding groove 159 has a periodic wave shape including the same number of mountain portions 159m and valley portions 159v as the mountain portions 152m and valley portions 152v of the second groove 152. Further, the number of mountain portions 139m and the number of valley portions 139v of the first corresponding groove 139 are different from the number of mountain portions 159m and the number of valley portions 159v of the second corresponding groove 159, respectively. In the embodiment, the second groove 152 and the second corresponding groove 159 are disposed such that the mountain portion 152m of the second groove 152 and the valley portion 159v of the second corresponding groove 159 face each other. Note that, in substantially the same manner as the first member 130c, for example, the second member 150c may be configured such that a portion provided with the second groove 152 and a portion provided with the second corresponding groove 159 are separate bodies.

The third rolling member 280 is configured to be rollable in the first corresponding groove 139 and in the second corresponding groove 159. The third rolling member 280 is configured, for example, in substantially the same manner as the first rolling member 170. The third rolling member 280 transmits torque between the first member 130 and the second member 150 in substantially the same manner as the first rolling member 170. The second regulating portion 205 allows movement of the third rolling member 280 along the rotation axis AX, and regulates movement of the third rolling member 280 around the rotation axis AX. The second regulating member 270 is configured in substantially the same manner as the first regulating portion 199, for example. To be specific, in the embodiment, the first regulating member 190 is provided with a slit portion 195c extending from the first groove 132 and the second groove 152 to the first corresponding groove 139 and the second groove 152 in the Z direction, and allowance and regulation of the movement of the first rolling member 170 and the third rolling member 280 are achieved by the slit portion 195c. Note that in the other embodiment, for example, the first regulating portion 199 and the second regulating portion 205 may have respective separate slit portions, and the allowance and regulation of the movement of the first rolling member 170 and the third rolling member 280 may be achieved by the respective slit portions.

In the embodiment, at least one of the first rolling members 170 is configured to be positioned at the mountain portions 132m of the first groove 132 when at least one of the third rolling members 280 is positioned at the valley portions 139v of the first corresponding groove 139. In addition, at least one of the first rolling members 170 is configured to be positioned at the mountain portions 152m of the second groove 152 when at least one of the third rolling members 280 is positioned at the valley portions 159v of the second corresponding groove 159. FIG. 9 illustrates a state in which one rolling member 280p included in the third rolling members 280 is positioned at the valley portion 139v and the valley portion 159v when one rolling member 170p included in the first rolling members 170 is positioned at the mountain portion 132m and the mountain portion 152m. Further, a state is illustrated in which one rolling member 280q included in the third rolling members 280 is positioned at the mountain portion 139m and the mountain portion 159m when one rolling member 170q included in the first rolling members 170 is positioned at the valley portion 132v and the valley portion 152v. Note that although not illustrated, when the rolling member 170p is positioned at the valley portion 132v and the valley portion 152v, the rolling member 280p is positioned at the mountain portion 139m and the mountain portion 159m. In substantially the same manner, when the rolling member 170q is positioned at the mountain portion 132m and the mountain portion 152m, the rolling member 280q is positioned at the valley portion 139v and the valley portion 159v.

According to the torque transmission mechanism 100c in the third embodiment described above, the third rolling member 280 disposed in the first corresponding groove 139 provided at the outer peripheral surface 131c of the first member 130c and in the second corresponding groove 159 provided at the inner peripheral surface 151c of the second member 150c is configured to be rollable in the first corresponding groove 139 and in the second corresponding groove 159. The movement of the third rolling member 280 along the rotation axis AX is allowed, and the movement of the third rolling member 280 around the rotation axis AX is regulated. With this configuration, torque can be transmitted between the first member 130 and the second member 150 using the first rolling member 170 and the third rolling member 280. Therefore, it is possible to reduce a load for each rolling member. Note that in other embodiments, for example, the first member 130 may be provided with two or more first corresponding grooves 139, and the second member 150 may be provided with two or more second corresponding grooves 159.

In addition, in the embodiment, when the rolling member 170p is positioned at the mountain portion 132m and the mountain portion 152m, the rolling member 280p is positioned at the valley portion 139v and the valley portion 159v. With this configuration, the first rolling member 170 and the third rolling member 280 can be moved in opposite directions to each other in the rotation axis AX direction, and the torque transmission mechanism 100c can be prevented from swinging in the rotation axis AX direction due to the movement of the first rolling member 170 and the third rolling member 280.

Furthermore, in the embodiment, the first groove 132 and the first corresponding groove 139 are disposed such that the mountain portion 132m of the first groove 132 and the valley portion 139v of the first corresponding groove 139 face each other. In addition, the second groove 152 and the second corresponding groove 159 are disposed such that the mountain portion 152m of the second groove 152 and the valley portion 159v of the second corresponding groove 159 face each other. In this way, as illustrated in FIG. 9, the first rolling member 170 and the third rolling member 280 can be disposed such that positions of the first rolling member 170 and the third rolling member 280 in the X direction are the same. As a result, as in the embodiment, for example, a pair of the first rolling member 170 and the third rolling member 280 are disposed in one slit portion 195c, and allowance and regulation of movement of the pair of the first rolling member 170 and the third rolling member 280 can be achieved with the slit portion 195c. In this way, it is possible to prevent the torque transmission mechanism 100c from swinging in the rotation axis AX direction with a simpler configuration.

D. Fourth Embodiment

Figure 10:
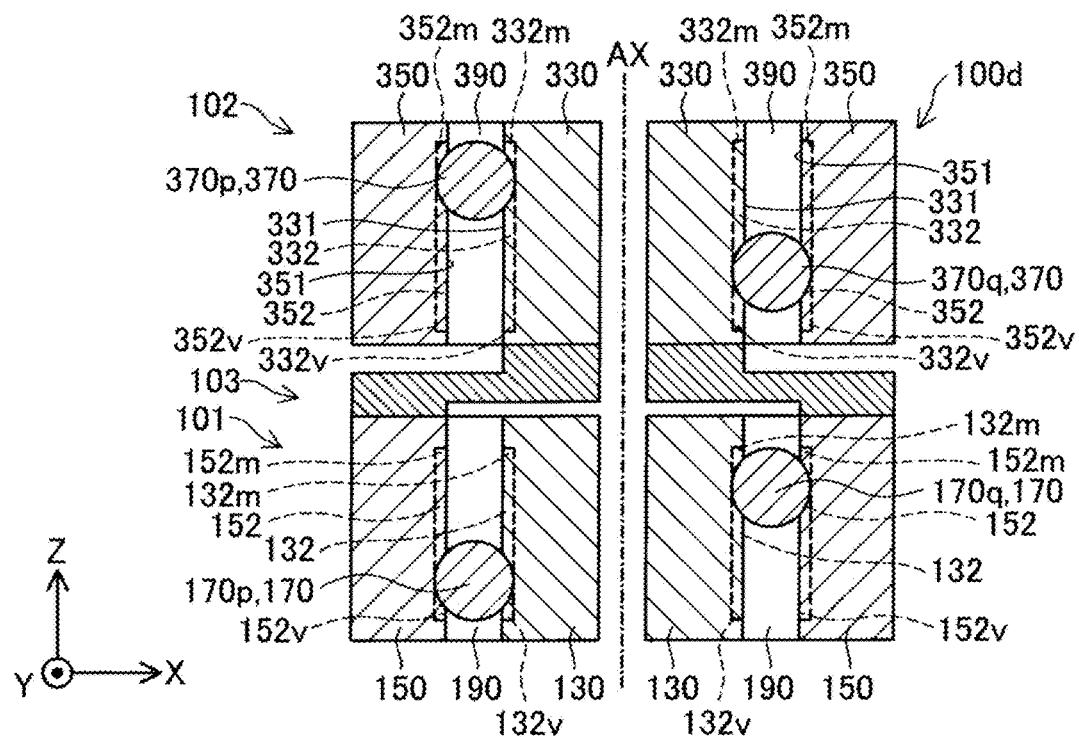
FIG. 10 is a cross-sectional view schematically illustrating a schematic configuration of a torque transmission mechanism in a fourth embodiment.

FIG. 10 is a cross-sectional view schematically illustrating a schematic configuration of a torque transmission mechanism 100d in a fourth embodiment. In substantially the same manner as FIGS. 8 and 9, FIG. 10 illustrates a cross-section of the torque transmission mechanism 100d along the X direction and the Z direction. In the embodiment, unlike the first embodiment, the torque transmission mechanism 100d includes a first deceleration portion 101, a second deceleration portion 102, and a coupling member 103. Points for the torque transmission mechanism 100d in the embodiment that are not particularly described are the same as those in the first embodiment.

The first deceleration portion 101 is configured similarly to the torque transmission mechanism 100 in the first embodiment. The second deceleration portion 102 is configured in substantially the same manner as the first deceleration portion 101, for example. The second deceleration portion 102 includes a fourth member 330, a fifth member 350, one or more fourth rolling members 370, and a third regulating member 390. Note that in the other embodiments, for example, portions of the second deceleration portion 102 and portions of the first deceleration portion 101 may be replaced with each other. The second deceleration portion 102 is disposed side by side with the first deceleration portion 101 in the Z direction. As a result, the fourth member 330 and the fifth member 350 are disposed side by side with the first member 130 and the second member 150 in the Z direction, respectively. Specifically, in the embodiment, the second deceleration portion 102 is positioned on the +Z direction side of the first deceleration portion 101, so that the fourth member 330 and the fifth member 350 are disposed on the +Z direction side of the first member 130 and the second member 150, respectively.

The fourth member 330 corresponds to the first member 130 in the first deceleration portion 101, and is configured in substantially the same manner as the first member 130, for example. The fourth member 330 has a cylindrical shape. The fourth member 330 is configured to be rotatable around the rotation axis AX. The fourth member 330 includes an outer peripheral surface 331 provided with a fifth groove 332. The fifth groove 332 is configured in substantially the same manner as the first groove 132, for example. The fifth groove 332 has a zigzag shape extending around the rotation axis AX and going around the outer peripheral surface 131 in the circumferential direction DC. The fifth groove 332 has a periodic wave shape including a mountain portion $332m$ and a valley portion $332v$, and has a period T5. The period T5 may be the same as or different from the period T1 or the period T2. The period T5 in the embodiment is one. In the embodiment, the first groove 132 and the fifth groove 332 are disposed such that the mountain portion $132m$ of the first groove 132 and the valley portion $332v$ of the fifth groove 332 face each other.

The fifth member 350 corresponds to the second member 150 in the first deceleration portion 101, and is configured in substantially the same manner as the second member 150, for example. The fifth member 350 has an annular shape surrounding the fourth member 330. The fifth member 350 is configured to be rotatable around the rotation axis AX. The fifth member 350 includes an inner peripheral surface 351 provided with a sixth groove 352. The sixth groove 352 is configured in substantially the same manner as the second groove 152, for example. The sixth groove 352 has a zigzag shape extending around the rotation axis AX and going around the inner peripheral surface 351 in the circumferential direction DC. The sixth groove 352 has a periodic wave shape including a mountain portion $352m$ and a valley portion $352v$. Further, the number of mountain portions $332m$ and the number of valley portions $332v$ of the fifth groove 332 are different from the number of mountain portions $352m$ and the number of valley portions $352v$ of the sixth groove 352, respectively. That is, a period T6 of the sixth groove 352 is different from the period T5 of the fifth groove 332. The period T6 may be the same as or different from the period T1 or the period T2. In the embodiment, a magnitude relationship between the period T6 and the period T5 is the same as the magnitude relationship between the period T2 and the period T1. To be specific, the period T6 in the embodiment is twelve. In the embodiment, the second groove 152 and the sixth groove 352 are disposed such that the mountain portion $152m$ of the second groove 152 and the valley portion $352v$ of the sixth groove 352 face each other.

The fourth rolling member 370 corresponds to the first rolling member 170 in the first deceleration portion 101, and is configured in substantially the same manner as the first rolling member 170, for example. The fourth rolling member 370 is disposed in the fifth groove 332 and in the sixth groove 352, and is configured to be rollable in the fifth groove 332 and in the sixth groove 352.

The third regulating member 390 corresponds to the first regulating member 190 in the first deceleration portion 101, and is configured in substantially the same manner as the first regulating member 190, for example. The third regulating member 390 is disposed between the fourth member 330 and the fifth member 350. The third regulating member 390 regulates movement of the fourth rolling member 370 around the rotation axis AX while allowing movement of the fourth rolling member 370 along the rotation axis AX. For example, similarly to the first regulating member 190, the third regulating member 390 achieves allowance and regulation of the movement of the fourth rolling member 370 by a slit portion.

The coupling member 103 couples the first deceleration portion 101 and the second deceleration portion 102. More specifically, the coupling member 103 couples the second member 150 and the fourth member 330 so as to be rotatable around the rotation axis AX. In the embodiment, the coupling member 103 is disposed between the second member 150 and the fourth member 330 in the Z direction, and is fixed to the upper end portion of the second member 150 and a lower end portion of the fourth member 330.

In the embodiment, in substantially the same manner as the second embodiment, a rotation speed can be achieved in a stepwise manner between the first member 130 and the second member 150 in the first deceleration portion 101 and between the fourth member 330 and the fifth member 350 in the second deceleration portion 102. Specifically, for example, when the first member 130 is used as the input shaft, the deceleration ratio RR1$a$ is achieved between the first member 130 and the second member 150 in the first deceleration portion 101. At this time, rotation of the second member 150 is transmitted to the fourth member 330 via the coupling member 103. Further, in the second deceleration portion 102, deceleration via the fourth rolling member 370 is achieved between the fourth member 330 and the fifth member 350. In this case, a deceleration ratio RR4$a$ achieved between the fourth member 330 and the fifth member 350 corresponds to a value obtained by dividing the period T5 by the period T6. As a result, a deceleration ratio RR5$a$ is achieved between the first member 130 as the input shaft and the fifth member 350 as the output shaft. The deceleration ratio RR5$a$ corresponds to a product of the deceleration ratio RR1$a$ and the deceleration ratio RR4$a$. Further, when the fifth member 350 is used as the input shaft, a deceleration ratio RR4$b$ is achieved between the fifth member 350 and the fourth member 330 in the second deceleration portion 102, and the deceleration ratio RR1$b$ is achieved in the first deceleration portion 101. As a result, a deceleration ratio RR5$b$ is achieved between the fifth member 350 as the input shaft and the first member 130 as the output shaft. The deceleration ratio RR5$b$ corresponds to a product of the deceleration ratio RR1$b$ and the deceleration ratio RR4$b$. That is, in this case, rotation input to the torque transmission mechanism 100$d$ is accelerated and output.

In the embodiment, at least one of the first rolling members 170 is configured to be positioned at the mountain portions $132m$ of the first groove 132 when at least one of the fourth rolling members 370 is positioned at the valley portions $332v$ of the fifth groove 332. In addition, the first rolling member 170 is configured to be positioned at the mountain portion $152m$ of the second groove 152 when at least one of the fourth rolling members 370 is positioned at the valley portions $352v$ of the sixth groove 352. FIG. 10 illustrates a state in which one rolling member 370$p$ included in the fourth rolling members 370 is positioned at the valley portion $332v$ and the valley portion $352v$ when one rolling member 170$p$ included in the first rolling members 170 is positioned at the mountain portion $132m$ and the mountain portion $152m$. Further, a state is illustrated in which one rolling member 370$q$ included in the fourth rolling members 370 is positioned at the mountain portion $332m$ and the mountain portion $352m$ when one rolling member 170$q$ included in the first rolling members 170 is positioned at the valley portion 132v and the valley portion 152v. Note that although not illustrated, when the rolling member 170p is positioned at the valley portion 132v and the valley portion 152v, the rolling member 370p is positioned at the mountain portion 332m and the mountain portion 352m. In substantially the same manner, when the rolling member 170q is positioned at the mountain portion 132m and the mountain portion 152m, the rolling member 370q is positioned at the valley portion 332v and the valley portion 352v.

According to the torque transmission mechanism 100d in the fourth embodiment described above, the first deceleration portion 101 and the second deceleration portion 102 are disposed side by side in the Z direction, and the second member 150 of the first deceleration portion 101 and the fourth member 330 of the second deceleration portion 102 are coupled to each other by the coupling member 103 so as to be rotatable around the rotation axis AX. In the second deceleration portion 102, the fourth rolling member 370 disposed in the fifth groove 332 of the fourth member 330 and in the sixth groove 352 of the fifth member 350 is configured to be rollable in the fifth groove 332 and in the sixth groove 352. In the fifth groove 332 and in the sixth groove 352, the movement of the fourth rolling member 370 along the rotation axis AX is allowed, and the movement of the fourth rolling member 370 around the rotation axis AX is allowed. Further, the number of mountain portions 332m and the number of valley portions 332v of the fifth groove 332 are different from the number of mountain portions 352m and the number of valley portions 352v of the sixth groove 352, respectively. Therefore, it is possible to reduce a rotation speed in a stepwise manner between the first member 130 and the second member 150, and between the fourth member 330 and the fifth member 350, and it is possible to achieve a higher deceleration ratio while configuring the torque transmission mechanism 100d in a more space-saving manner in a radial direction. Note that in the other embodiments, for example, another deceleration portion may be coupled to the first deceleration portion 101 or the second deceleration portion 102 to achieve deceleration in a further stepwise manner, for example. Further, for example, by combining the configuration in the third embodiment and the configuration in the fourth embodiment, deceleration in a further stepwise manner may be achieved.

In addition, in the embodiment, when the rolling member 170p is positioned at the mountain portion 132m and the mountain portion 152m, the rolling member 370p is positioned at the valley portion 332v and the valley portion 352v. With this configuration, the first rolling member 170 and the fourth rolling member 370 can be moved in directions opposite to each other in the rotation axis AX direction, and the torque transmission mechanism 100d can be prevented from swinging in the rotation axis AX direction due to the movement of the first rolling member 170 and the fourth rolling member 370.

E. Fifth Embodiment

Figure 11:
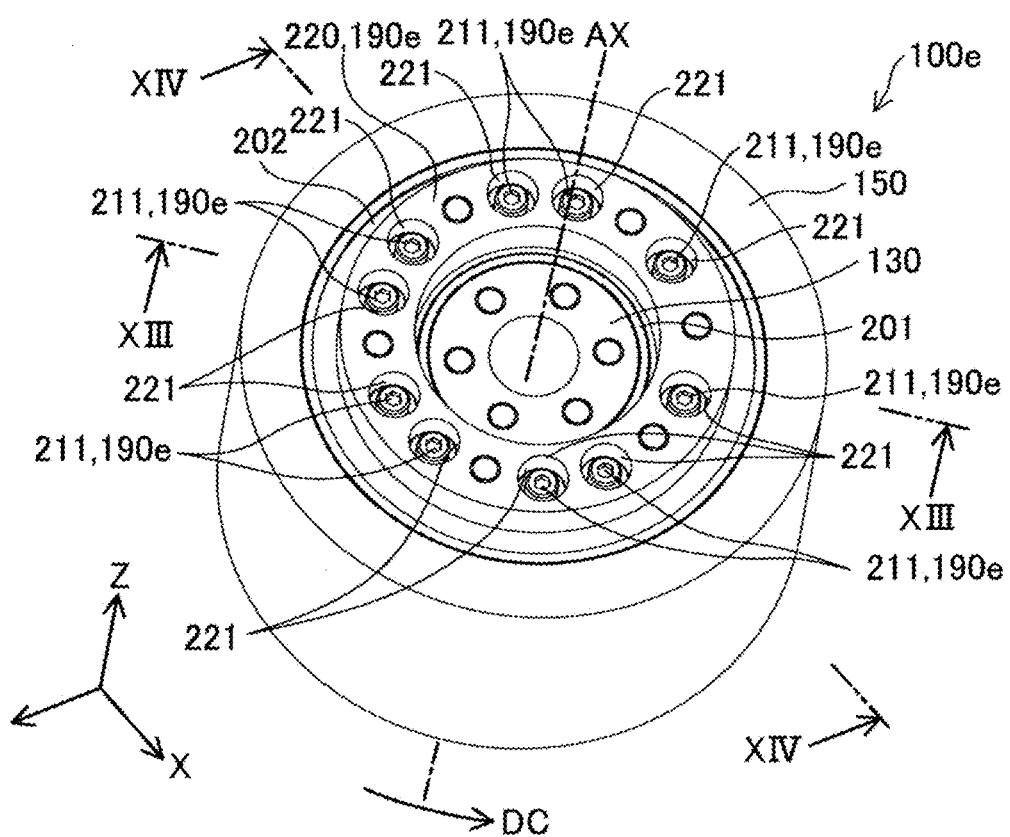
FIG. 11 is a perspective view illustrating a schematic configuration of a torque transmission mechanism in a fifth embodiment.
Figure 12:
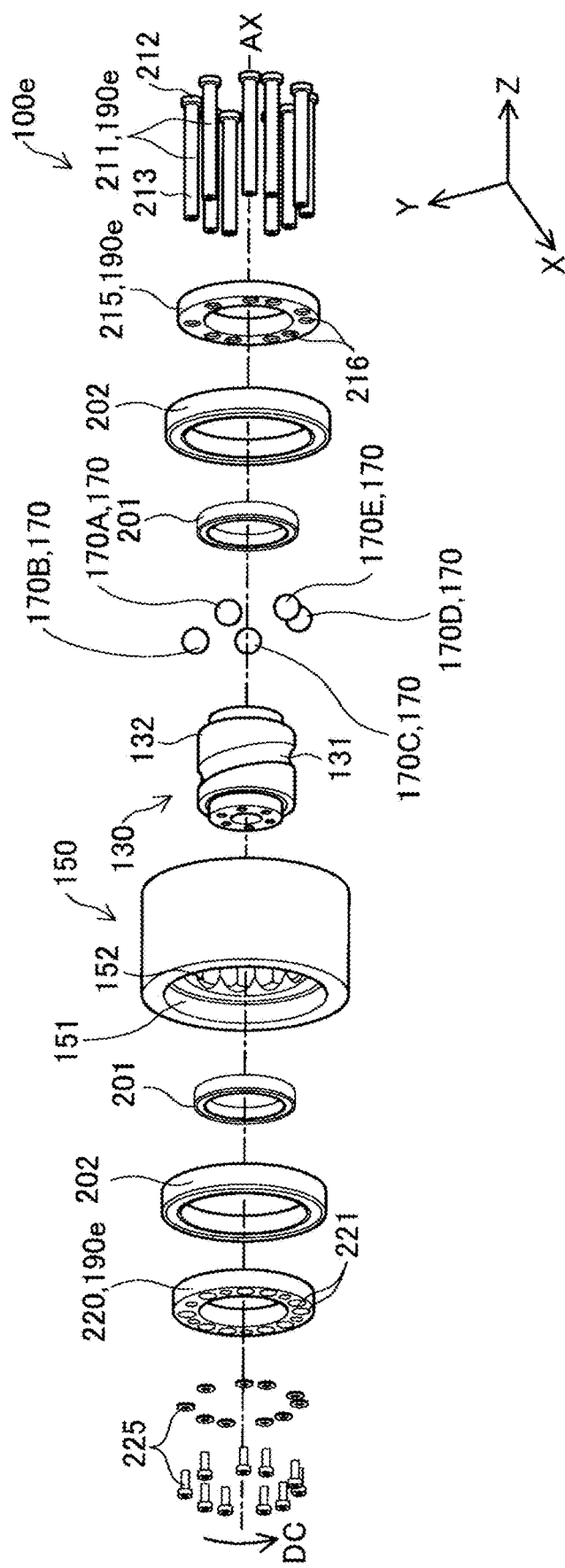
FIG. 12 is an exploded perspective view illustrating a schematic configuration of the torque transmission mechanism in the fifth embodiment.
Figure 13:
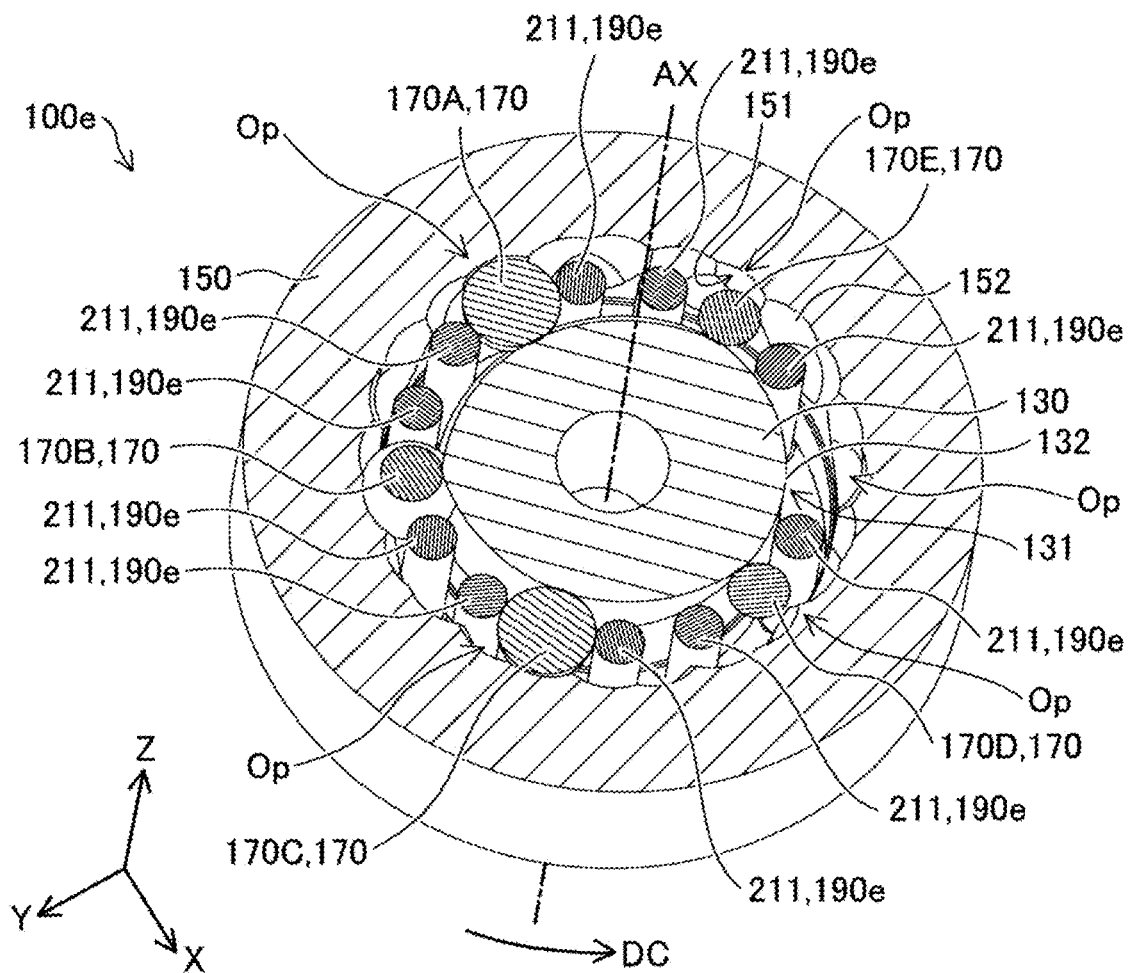
FIG. 13 is a cross-sectional view taken along line XIII-XIII in FIG. 11.
Figure 14:
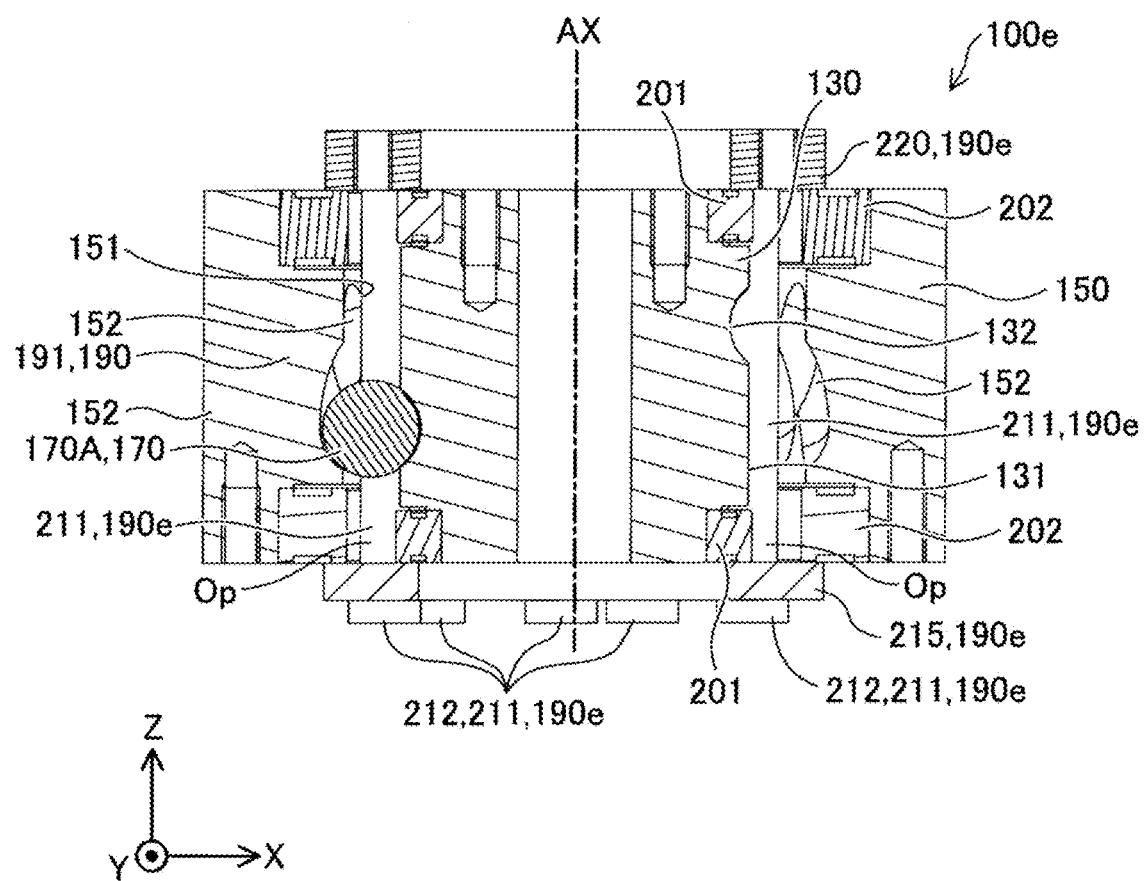
FIG. 14 is a cross-sectional view taken along line XIV-XIV in FIG. 11.

FIG. 11 is a perspective view illustrating a schematic configuration of a torque transmission mechanism 100e in a fifth embodiment. FIG. 12 is an exploded perspective view illustrating a schematic configuration of the torque transmission mechanism 100e. FIG. 13 is a cross-sectional view taken along line XIII-XIII in FIG. 11. FIG. 14 is a cross-sectional view taken along line XIV-XIV in FIG. 11. The embodiment is different from the first embodiment in a configuration of a regulating member 190e. Points for the torque transmission mechanism 100e in the embodiment that are not particularly described are the same as those in the first embodiment.

As illustrated in FIGS. 11, 12, and 14, the first regulating member 190e in the embodiment includes a columnar member 211, a first annular member 215, and a second annular member 220.

The first annular member 215 has an annular shape. The first annular member 215 is disposed such that an axial direction of the first annular member 215 is along the Z direction. The first annular member 215 is provided with a plurality of first through-holes 216. The first through-hole 216 penetrates the first annular member 215 in the Z direction. In the embodiment, the first annular member 215 is provided with ten first through-holes 216.

The second annular member 220 has an annular shape. The second annular member 220 is disposed such that an axial direction of the second annular member 220 is along the Z direction. The second annular member 220 is provided with a plurality of second through-holes 221. The second through-hole 221 penetrates the second annular member 220 in the Z-direction. In the embodiment, the second annular member 220 is provided with ten second through-holes 221 corresponding to the ten first through-holes 216.

In the embodiment, ten columnar members 211 are provided corresponding to the ten first through-holes 216 and the ten second through-holes 221. The columnar member 211 has a cylindrical shape as a whole. The columnar member 211 is disposed such that an axial direction of the columnar member 211 is along the Z direction. The columnar member 211 includes a head portion 212 and a shaft portion 213. The head portion 212 has a diameter larger than an opening diameter of the first through-hole 216 and an opening diameter of the second through-hole 221. The head portion 212 constitutes an upper end portion of the columnar member 211. The shaft portion 213 has a diameter slightly smaller than the opening diameter of the first through-hole 216 and the opening diameter of the second through-hole 221. Each columnar member 211 is inserted into the second through-hole 221 and the first through-hole 216 from the +Z direction side. That is, the shaft portion 213 of each columnar member 211 is disposed in the first through-hole 216 and in the second through-hole 221. In addition, the head portion 212 of each columnar member 211 is disposed on the +Z direction side of the second annular member 220. Further, a lower end portion of each columnar member 211 is fixed to the first annular member 215 via a fixing member 225 and the first through-hole 216. The fixing member 225 is constituted by, for example, a bolt and a washer. With such a configuration, the columnar members 211 are coupled to each other in the horizontal direction by the first annular member 215 and the second annular member 220.

As illustrated in FIGS. 12 and 14, when the columnar members 211 are coupled to each other in the horizontal direction, opening portions are formed between the columnar members 211 adjacent to each other in the circumferential direction DC. In the embodiment, the first rolling members 170 are disposed at five opening portions Op among such opening portions. An opening width of each opening portion Op in the circumferential direction DC is slightly larger than the diameter of the first rolling member 170. An opening length of each opening portion Op in the Z direction is larger than the opening width of each opening portion Op. In substantially the same manner as the slit portion 195 described in the first embodiment, the opening portion Op allows the movement of each first rolling member 170 in the Z direction and regulates the movement of each first rolling member 170 around the rotation axis AX. Specifically, the movement of the first rolling member 170 around the rotation axis AX is regulated by the columnar member 211 that defines the opening portion Op. As described above, the first regulating member 190e in the embodiment achieves allowance and regulation of the movement of each first rolling member 170 by the opening portion Op. Note that the first regulating member 190e and the first regulating member 190 described in the first embodiment are similar to each other in that both achieve the allowance and the regulation of the movement of the first rolling member 170 by the groove-like openings extending in the Z direction.

According to the torque transmission mechanism 100e in the fifth embodiment described above as well, a rotation speed can be reduced between the first member 130 and the second member 150 via the first rolling member 170 in accordance with the first groove 132 and the second groove 152 without using a pin for torque transmission.

Note that a similar configuration to that of the first regulating member 190e in the fifth embodiment may be applied to, for example, the second regulating member 270 described in the second embodiment or the third regulating member 390 described in the fourth embodiment.

F. Other Embodiments (F-1) In each of the above embodiments, the first rolling member 170 has a spherical shape. On the other hand, the first rolling member 170 need not have a spherical shape as long as the first rolling member 170 is rollable in the first groove 132 and in the second groove 152. For example, the first rolling member 170 may have a curved surface shape that is different from a spherical shape that enables rolling in the first groove 132 and in the second groove 152.

(F-2) In each of the above embodiments, the plurality of first rolling members 170 are provided. On the other hand, the number of first rolling member 170 may be one. In addition, as long as torque transmission by the torque transmission mechanism 100 is possible and each first rolling member 170 can be disposed in the first groove 132 and in the second groove 152, the number of first rolling members 170 and a mode of disposition of the first rolling members 170 may be optional. For example, the number of first rolling members 170 may be from two to four, or may be six or more. In substantially the same manner, the number and modes of disposition of the second rolling members 250, the third rolling members 280, and the fourth rolling members 370 may be optional. Further, the number of first rolling members 170, the number of second rolling members 250, the number of third rolling members 280, and the number of fourth rolling members 370 may be the same as or different from each other.

(F-3) In each of the above embodiments, the first bearing portion 201 is provided, but need not be provided. Further, in substantially the same manner, the second bearing portion 202 need not be provided.

(F-4) In each of the above embodiments, although the period T1 of the first groove 132 is smaller than the period T2 of the second groove 152, the period T1 may be larger than the period T2. In this case, when the first member 130 is used as the input shaft, acceleration is achieved between the first member 130 and the second member 150. Further, when the second member 150 is used as the input shaft, deceleration is achieved between the second member 150 and the first member 130. In addition, in substantially the same manner, the period T3 may be larger than the period T4. In addition, in substantially the same manner, the period T5 may be larger than the period T6.

(F-5) In the above embodiment, the first groove 132 or the second groove 152 has a triangular wave shape, but need not have a triangular wave shape. For example, the first groove 132 or the second groove 152 may have a zigzag shape such as a sinusoidal shape or a sawtooth wave shape. Similarly, each of the third groove 162, the fourth groove 232, the fifth groove 332, and the sixth groove 352 need not have a triangular wave shape.

(F-6) In each of the above embodiments, the number of mountain portions 132m and the number of valley portions 132v of the first groove 132, and the number of mountain portions 152m and the number of valley portions 152v of the second groove 152 are different, respectively, but may be the same, respectively. In this case, the period T1 of the first groove 132 and the period T2 of the second groove 152 are the same as each other. That is, the torque transmission mechanism 100 need not be configured as a deceleration device.

Figure 15:
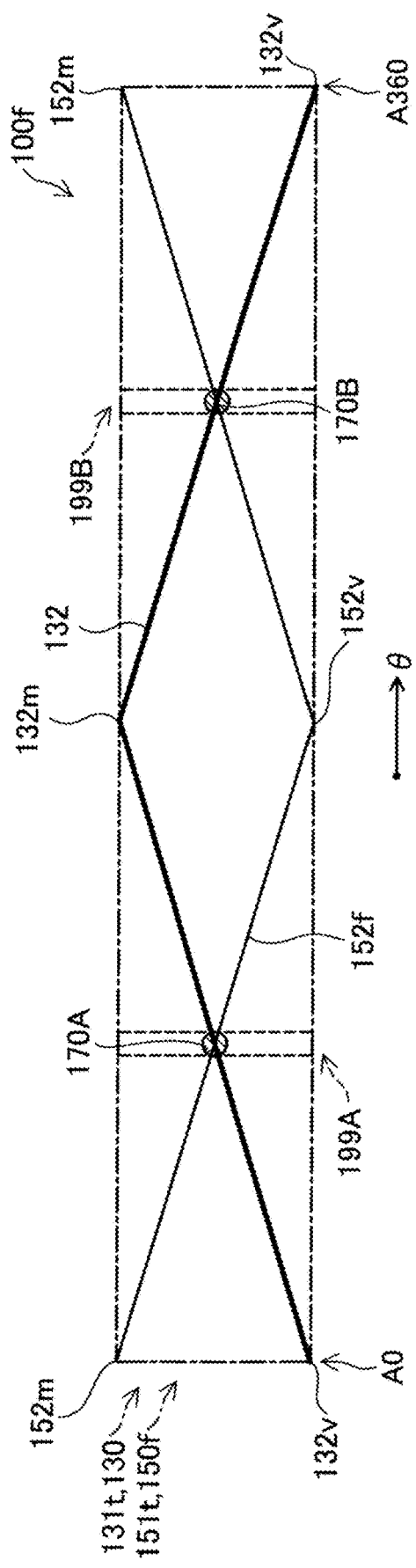
FIG. 15 is an explanatory view of a first example of torque transmission mechanisms in other embodiments.
Figure 16:
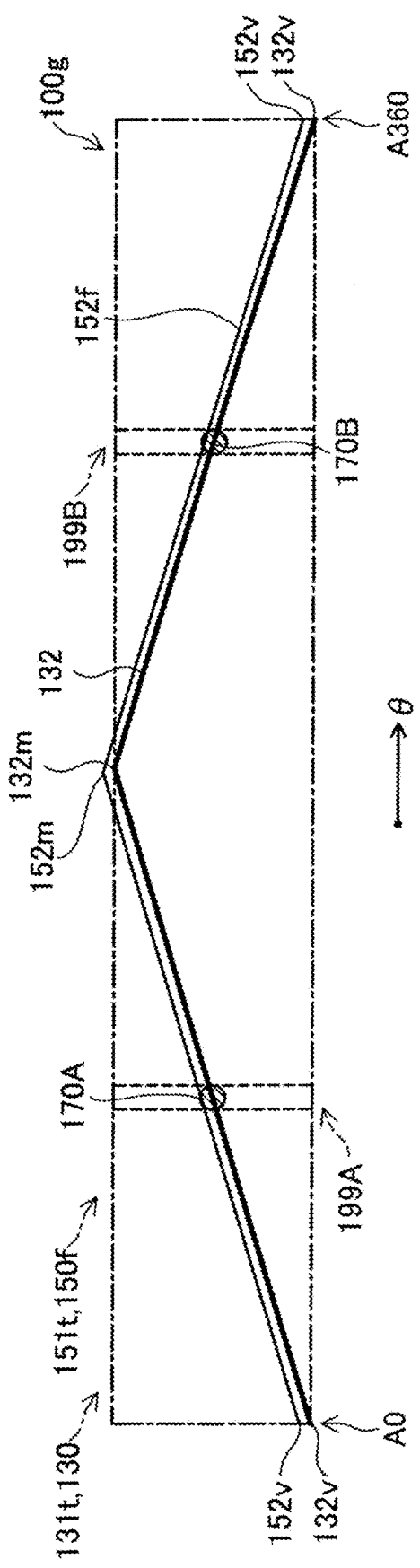
FIG. 16 is an explanatory view of a second example of the torque transmission mechanisms in the other embodiments.

For example, FIG. 15 is an explanatory view of a torque transmission mechanism 100f which is a first example of torque transmission mechanisms in the other embodiments. For example, FIG. 16 is an explanatory view of a torque transmission mechanism 100g which is a second example of the torque transmission mechanisms in the other embodiments. FIGS. 15 and 16 illustrate the outer peripheral surface 131t and the inner peripheral surface 151t in substantially the same manner as FIG. 5. In the examples in FIGS. 15 and 16, the number of mountain portion 132m and the number of valley portion 132v of the first groove 132 are the same as the number of mountain portion 152m and the number of valley portion 152v of a second groove 152f, respectively, and are one. In addition, in the examples in FIGS. 15 and 16, the rolling member 170A and the rolling member 170B are included as the first rolling members 170, and the regulating portion 199A and the regulating portion 199B are provided as the first regulating portions 199. In the example in FIG. 15, when the outer peripheral surface 131t and the inner peripheral surface 151t are viewed along the radial direction DR, the first member 130 and a second member 150f are disposed such that the mountain portion 132m of the first groove 132 and the valley portion 152v of the second groove 152f are disposed at the same position in the circumferential direction DC, that is, phases of the first groove 132 and the second groove 152f are opposite to each other. With this configuration, when rotation is input to one of the first member 130 and the second member 150f, rotation in a direction opposite to the input rotation can be output from another. Further, as illustrated in FIG. 16, when the outer peripheral surface 131t and the inner peripheral surface 151t are viewed along the radial direction DR, the first member 130 and the second member 150f can be disposed such that the mountain portion 132m of the first groove 132 and the mountain portion 152m of the second groove 152f are disposed at the same position in the circumferential direction DC, that is, the first groove 132 and the second groove 152f have the same phase. Note that in order to facilitate understanding of the technique, FIG. 16 is illustrated such that the first groove 132 and the second groove 152f are shifted from each other, but in actuality, the first groove 132 and the second groove 152f overlap each other. With this configuration, when rotation is input to one of the first member 130 and the second member 150f, rotation in the same direction as the input rotation can be output from another. As described above, even when the period T1 and the period T2 are the same, torque transmission can be achieved between the first member 130 and the second member 150f without using a pin for torque transmission. Further, by using the same first member 130, second member 150f, and first regulating member 190, it is possible to easily configure a forward-rotation type torque transmission mechanism that outputs rotation in the same direction as input rotation and a backward-rotation type torque transmission mechanism that outputs rotation in an opposite direction to input rotation.

(F-7) In the above third embodiment, the mountain portion 132m of the first groove 132 and the valley portion 139v of the first corresponding groove 139 face each other, and the mountain portion 152m of the second groove 152 and the valley portion 159v of the second corresponding groove 159 face each other. On the other hand, the mountain portion 132m and the valley portion 139v need not face each other. Further, the mountain portion 152m and the valley portion 159v need not face each other. In this case, for example, while the mountain portion 132m and the valley portion 139v face each other, the mountain portion 152m and the valley portion 159v need not face each other. In addition, for example, while the mountain portion 152m and the valley portion 159v face each other, the mountain portion 132m and the valley portion 139v need not face each other. Further, in substantially the same manner, in the above fourth embodiment, the mountain portion 132m of the first groove 132 and the valley portion 332v of the fifth groove 332 need not face each other. In addition, the mountain portion 152m of the second groove 152 and the valley portion 352v of the sixth groove 352 need not face each other.

Figure 17:
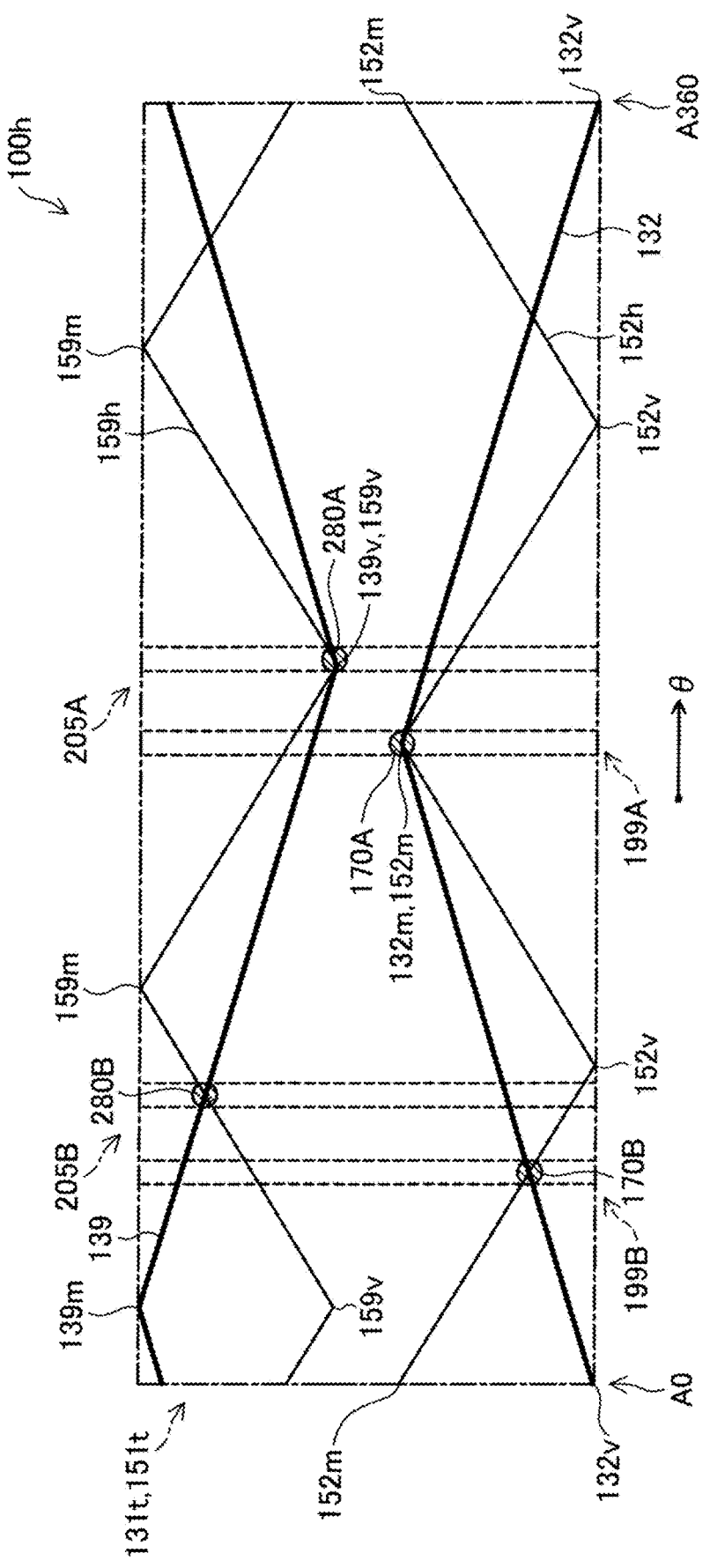
FIG. 17 is an explanatory view of a third example of the torque transmission mechanisms in the other embodiments.

FIG. 17 is an explanatory view of a torque transmission mechanism 100h which is a third example of the torque transmission mechanisms in the other embodiments. In substantially the same manner as FIG. 5, FIG. 17 illustrates the outer peripheral surface 131t and the inner peripheral surface 151t. In the same manner as the third embodiment, the torque transmission mechanism 100h is provided with the first groove 132 and the first corresponding groove 139, and a second groove 152h and a second corresponding groove 159h. In the example in FIG. 17, the number of mountain portions 152m and the number of valley portions 152v of the second groove 152h and the number of mountain portions 159m and the number of valley portions 159v of the second corresponding groove 159h are each two. In addition, in the example in FIG. 17, the rolling member 170A and the rolling member 170B are provided as the first rolling members 170, and the regulating portion 199A and the regulating portion 199B are provided as the first regulating portions 199. In addition, a rolling member 280A and a rolling member 280B are provided as the third rolling members 280, and a regulating portion 205A and a regulating portion 205B are provided as the second regulating portions 205. Each of the regulating portions 205A and 205B includes a slit portion extending in the Z direction in substantially the same manner as the regulating portion 199A and the regulating portion 199B. The regulating portions 205A and 205B allow movement of the rolling members 280A and 280B along the rotation axis AX, respectively, and regulate movement of the rolling members 280A and 280B around the rotation axis AX by the slit portions, respectively. In the example in FIG. 17, unlike the third embodiment, the mountain portion 132m and the valley portion 139v do not face each other, and the mountain portion 152m and the valley portion 159v do not face each other. However, in the example in FIG. 17, in the same manner as the third embodiment, when at least one of the third rolling members 280 is positioned at the valley portions 139v of the first corresponding groove 139, at least one of the first rolling members 170 is positioned at the mountain portions 132m of the first groove 132. In addition, at least one of the first rolling members 170 is positioned at the mountain portions 152m of the second groove 152 when at least one of the third rolling members 280 is positioned at the valley portions 159v of the second corresponding groove 159h. Note that FIG. 17 illustrates a state in which the rolling member 170A is positioned at the mountain portion 132m and the mountain portion 152m, and the rolling member 280A is positioned at the valley portion 139v and the valley portion 159v. With this configuration, in the same manner as the third embodiment, it is possible to prevent the torque transmission mechanism 100h from swinging in the Z direction due to the movement of the first rolling member 170 and the third rolling member 280. In this way, even in a mode in which the mountain portion 132m and the valley portion 139v do not face each other and the mountain portion 152m and the valley portion 159v do not face each other, it is possible to prevent the torque transmission mechanism 100h from swinging in the Z direction.

G. Other Aspects

The present disclosure is not limited to the embodiments described above, and may be achieved in various aspects without departing from the spirits of the disclosure. For example, the present disclosure may be achieved through the following aspects. Appropriate replacements or combinations may be made to the technical features in the above-described embodiments which correspond to the technical features in the aspects described below to solve some or all of the problems of the disclosure or to achieve some or all of the advantageous effects of the disclosure. Further, even when technical characteristics are not described as essential ones in the present specification, it is possible to delete the technical characteristics in the embodiments appropriately.

(1) According to a first aspect of the present disclosure, a torque transmission mechanism is provided. The torque transmission mechanism includes a first member having a cylindrical shape and configured to be rotatable around a rotation axis, the first member including an outer peripheral surface provided with a first groove having a zigzag shape extending around the rotation axis, a second member having an annular shape surrounding the first member and configured to be rotatable around the rotation axis, the second member including an inner peripheral surface provided with a second groove having a zigzag shape extending around the rotation axis, one or more first rolling members disposed in the first groove and in the second groove and configured to be rollable in the first groove and in the second groove, and a first regulating member disposed between the first member and the second member and configured to allow movement of the first rolling members along the rotation axis and regulate movement of the first rolling members around the rotation axis.

According to this aspect, it is possible to transmit torque between the first member and the second member via the first rolling members in accordance with the first groove and the second groove without using a pin for torque transmission.

(2) In the aspect described above, the first groove and the second groove may have a periodic wave shape including one or more mountain portions and valley portions, and the number of the mountain portions and the number of the valley portions of the first groove may be different from the number of the mountain portions and the number of the valley portions of the second groove, respectively. According to this aspect, it is possible to reduce a rotation speed between the first member and the second member in accordance with the number of mountain portions and the number of valley portions of the first groove and the number of mountain portions and the number of valley portions of the second groove.

(3) In the aspect described above, the first rolling members may have a spherical shape. According to this aspect, it is possible to more smoothly roll the first rolling members.

(4) In the above aspect, the first rolling members may include one rolling member and another rolling member, and the first regulating member may include one regulating portion that allows movement of the one rolling member along the rotation axis and regulates movement of the first rolling members around the rotation axis, and another regulating portion that allows movement of the other rolling member along the rotation axis and regulates movement of the other rolling member around the rotation axis. According to this aspect, it is possible to reduce a load for each rolling member.

(5) The aspect described above may further include a first bearing portion disposed between the first member and the first regulating member and configured to hold the first member so as to be rotatable with respect to the first regulating member. According to this aspect, it is possible to more smoothly rotate the first member with respect to the first regulating member via the first bearing portion.

(6) The aspect described above may further include a second bearing portion disposed between the second member and the first regulating member and configured to hold the second member so as to be rotatable with respect to the first regulating member. According to this aspect, it is possible to more smoothly rotate the second member with respect to the first regulating member via the second bearing portion.

(7) In the aspect described above, an outer peripheral surface of the second member may be provided with a third groove having a zigzag shape extending around the rotation axis, the torque transmission mechanism may further include a third member having an annular shape surrounding the second member and configured to be rotatable around the rotation axis, the third member including an inner peripheral surface provided with a fourth groove having a zigzag shape extending around the rotation axis, one or more second rolling members disposed in the third groove and in the fourth groove and configured to be rollable in the third groove and in the fourth groove, and a second regulating member that is disposed between the second member and the third member, allows movement of the second rolling members along the rotation axis, and regulates movement of the second rolling members around the rotation axis, the third groove and the fourth groove may have a periodic wave shape including at least one of the mountain portions and the valley portions, and the number of the mountain portions and the number of the valley portions of the third groove may be different from the number of the mountain portions and the number of the valley portions of the fourth groove, respectively. According to this aspect, a rotation speed can be reduced in a stepwise manner between the first member and the second member, and between the second member and the third member, and a higher deceleration ratio can be achieved.

(8) In the aspect described above, an outer peripheral surface of the first member may be provided with a first corresponding groove corresponding to the first groove side by side with the first groove in the rotation axis direction, an inner peripheral surface of the second member may be provided with a second corresponding groove corresponding to the second groove side by side with the second groove in a direction of the rotation axis, the torque transmission mechanism may further include one or more third rolling members disposed in the first corresponding groove and in the second corresponding groove and configured to be rollable in the first corresponding groove and in the second corresponding groove, and the first regulating member may further allow movement of the third rolling members along the rotation axis and regulate movement of the third rolling members around the rotation axis. According to this aspect, it is possible to reduce a load for each rolling member.

(9) In the aspect described above, the first groove and the first corresponding groove may each have a periodic wave shape including the same number of the mountain portions and the valley portions, the second groove and the second corresponding groove may each have a periodic wave shape including the same number of the mountain portions and the valley portions, and at least one of the first rolling members may be configured to be positioned at the mountain portions of the first groove when at least one of the third rolling members is positioned at the valley portions of the first corresponding groove, and to be positioned at the mountain portions of the second groove when the at least one of the third rolling members is positioned at the valley portions of the second corresponding groove. According to this aspect, it is possible to move the first rolling members and the third rolling members in directions opposite to each other in the rotation axis direction, and it is possible to prevent the torque transmission mechanism from swinging in the rotation axis direction due to the movement of the first rolling members and the third rolling members in the rotation axis direction.

(10) In the aspect described above, the first groove and the first corresponding groove may be disposed such that the mountain portions of the first groove and the valley portions of the first corresponding groove face each other, and the second groove and the second corresponding groove may be disposed such that the mountain portions of the second groove and the valley portions of the second corresponding groove face each other. According to this aspect, it is possible to prevent the torque transmission mechanism from swinging in the rotation axis direction with a simpler configuration.

(11) The aspect described above may include a fourth member having a cylindrical shape and configured to be rotatable around the rotation axis, the fourth member including an outer peripheral surface provided with a fifth groove having a zigzag shape extending around the rotation axis, a fifth member having an annular shape surrounding the fourth member and configured to be rotatable around the rotation axis, the fifth member including an inner peripheral surface provided with a sixth groove having a zigzag shape extending around the rotation axis, one or more fourth rolling members disposed in the fifth groove and in the sixth groove and configured to be rollable in the fifth groove and in the sixth groove, and a third regulating member disposed between the fourth member and the fifth member and configured to allow movement of the fourth rolling members along the rotation axis and regulate movement of the fourth rolling members around the rotation axis, and a coupling member configured to couple the second member and the fourth member so as to be rotatable around the rotation axis, wherein the fourth member and the fifth member may be disposed side by side with the first member and the second member in the direction of the rotation axis, the fifth groove and the sixth groove may have a periodic wave shape including at least one of the mountain portions and the valley portions, and the number of the mountain portions and the number of the valley portions of the fifth groove may be different from the number of the mountain portions and the number of the valley portions of the sixth groove, respectively. According to this aspect, it is possible to reduce a rotation speed in a stepwise manner between the first member and the second member and between the fourth member and the fifth member, and it is possible to achieve a higher deceleration ratio while configuring the torque transmission mechanism in a more space-saving manner in a radial direction.

(12) In the aspect described above, each of the first groove and the fifth groove may include the same number of the mountain portions and the valley portions, each of the second groove and the sixth groove may include the same number of the mountain portions and the valley portions, and at least one of the first rolling members may be configured to be positioned at the mountain portions of the first groove when at least one of the fourth rolling members is positioned at the valley portions of the fifth groove, and may be configured to be positioned at the mountain portions of the second groove when at least one of the fourth rolling members is positioned at the valley portions of the sixth groove. According to this aspect, it is possible to move the first rolling members and the fourth rolling members in directions opposite to each other in the rotation axis direction, and it is possible to prevent the torque transmission mechanism from swinging in the rotation axis direction due to the movement of the first rolling members and the fourth rolling members in the rotation axis direction.

(13) In the aspect described above, the first groove and the second groove may have a triangular wave shape. According to this aspect, it is possible to achieve more efficient torque transmission between the first member and the second member.

What is claimed is:

1. A torque transmission mechanism, comprising:
   a first member having a cylindrical shape and configured to be rotatable around a rotation axis, the first member including an outer peripheral surface provided with a first groove having a zigzag shape extending around the rotation axis;
   a second member having an annular shape surrounding the first member and configured to be rotatable around the rotation axis, the second member including an inner peripheral surface provided with a second groove having a zigzag shape extending around the rotation axis;
   one or more first rolling members disposed in the first groove and in the second groove and configured to be rollable in the first groove and in the second groove; and
   a first regulating member disposed between the first member and the second member and configured to allow movement of the first rolling members along the rotation axis and regulate movement of the first rolling members around the rotation axis.

2. The torque transmission mechanism according to claim 1, wherein
   the first groove and the second groove have a periodic wave shape including one or more mountain portions and valley portions, and
   a number of the mountain portions and a number of the valley portions of the first groove are different from the number of the mountain portions and the number of the valley portions of the second groove, respectively.

3. The torque transmission mechanism according to claim 2, wherein
   an outer peripheral surface of the second member is provided with a third groove having a zigzag shape extending around the rotation axis,
   the torque transmission mechanism further includes
   a third member having an annular shape surrounding the second member and configured to be rotatable around the rotation axis, the third member including an inner peripheral surface provided with a fourth groove having a zigzag shape extending around the rotation axis,
   one or more second rolling members disposed in the third groove and in the fourth groove and configured to be rollable in the third groove and in the fourth groove, and
   a second regulating member that is disposed between the second member and the third member, allows movement of the second rolling members along the rotation axis, and regulates movement of the second rolling members around the rotation axis,
   the third groove and the fourth groove have a periodic wave shape including at least one of the mountain portions and the valley portions, and
   the number of the mountain portions and the number of the valley portions of the third groove are different from the number of the mountain portions and the number of the valley portions of the fourth groove, respectively.

4. The torque transmission mechanism according to claim 2, further comprising:
   a fourth member having a cylindrical shape and configured to be rotatable around the rotation axis, the fourth member including an outer peripheral surface provided with a fifth groove having a zigzag shape extending around the rotation axis;
   a fifth member having an annular shape surrounding the fourth member and configured to be rotatable around the rotation axis, the fifth member including an inner peripheral surface provided with a sixth groove having a zigzag shape extending around the rotation axis;
   one or more fourth rolling members disposed in the fifth groove and in the sixth groove and configured to be rollable in the fifth groove and in the sixth groove; and
   a third regulating member disposed between the fourth member and the fifth member and configured to allow movement of the fourth rolling members along the rotation axis and regulate movement of the fourth rolling members around the rotation axis; and
   a coupling member configured to couple the second member and the fourth member so as to be rotatable around the rotation axis, wherein
   the fourth member and the fifth member are disposed side by side with the first member and the second member in a direction of the rotation axis,
   the fifth groove and the sixth groove have a periodic wave shape including at least one of the mountain portions and the valley portions, and
   the number of the mountain portions and the number of the valley portions of the fifth groove are different from the number of the mountain portions and the number of the valley portions of the sixth groove, respectively.

5. The torque transmission mechanism according to claim 4, wherein
   each of the first groove and the fifth groove includes the same number of the mountain portions and the valley portions, each of the second groove and the sixth groove includes the same number of the mountain portions and the valley portions, and at least one of the first rolling members is configured to be positioned at the mountain portions of the first groove when at least one of the fourth rolling members is positioned at the valley portions of the fifth groove, and is configured to be positioned at the mountain portions of the second groove when at least one of the fourth rolling members is positioned at the valley portions of the sixth groove.

6. The torque transmission mechanism according to claim 1, wherein
the first rolling members have a spherical shape.

7. The torque transmission mechanism according to claim 1, wherein
the first rolling members include one rolling member and another rolling member, and
the first regulating member include one regulating portion that allows movement of the one rolling member along the rotation axis and regulates movement of the first rolling members around the rotation axis, and another regulating portion that allows movement of the another rolling member along the rotation axis and regulates movement of the another rolling member around the rotation axis.

8. The torque transmission mechanism according to claim 1, further comprising a first bearing portion disposed between the first member and the first regulating member and configured to hold the first member so as to be rotatable with respect to the first regulating member.

9. The torque transmission mechanism according to claim 1, further comprising a second bearing portion disposed between the second member and the first regulating member and configured to hold the second member so as to be rotatable with respect to the first regulating member.

10. The torque transmission mechanism according to claim 1, wherein
the outer peripheral surface of the first member is provided with a first corresponding groove having a zigzag shape corresponding to the first groove side by side with the first groove in a direction of the rotation axis,
the inner peripheral surface of the second member is provided with a second corresponding groove having a zigzag shape corresponding to the second groove side by side with the second groove in the direction of the rotation axis,
the torque transmission mechanism further includes one or more third rolling members disposed in the first corresponding groove and in the second corresponding groove and configured to be rollable in the first corresponding groove and in the second corresponding groove, and
the first regulating member further allows movement of the third rolling members along the rotation axis and regulates movement of the third rolling members around the rotation axis.

11. The torque transmission mechanism according to claim 8, wherein
the first groove and the first corresponding groove each have a periodic wave shape including the same number of the mountain portions and the valley portions,
the second groove and the second corresponding groove each have a periodic wave shape including the same number of the mountain portions and the valley portions, and
at least one of the first rolling members is configured to be positioned at the mountain portions of the first groove when at least one of the third rolling members is positioned at the valley portions of the first corresponding groove, and to be positioned at the mountain portions of the second groove when the at least one of the third rolling members is positioned at the valley portions of the second corresponding groove.

12. The torque transmission mechanism according to claim 11, wherein
the first groove and the first corresponding groove are disposed such that the mountain portions of the first groove and the valley portions of the first corresponding groove face each other, and
the second groove and the second corresponding groove are disposed such that the mountain portions of the second groove and the valley portions of the second corresponding groove face each other.

13. The torque transmission mechanism according to claim 1, wherein
the first groove and the second groove have a triangular wave shape.

* * * * *